(12) United States Patent  (10) Patent No.: US 8,415,071 B2
Tanaka et al.  (45) Date of Patent: Apr. 9, 2013

(54) ELECTROLYTE MEMBRANE WITH ANISOTOPIC SWELLING AND ALIGNED FILLER

(75) Inventors: Shiro Tanaka, Yokohama (JP); Hiroshi Tabata, Yokohama (JP); Shuguo Zhang, Sakai (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/595,692

(22) PCT Filed: Jun. 4, 2008

(86) PCT No.: PCT/JP2008/001413
§ 371 (c)(1),
(2), (4) Date: Oct. 13, 2009

(87) PCT Pub. No.: WO2009/001511
PCT Pub. Date: Dec. 31, 2008

(65) Prior Publication Data
US 2010/0143823 A1  Jun. 10, 2010

(30) Foreign Application Priority Data

Jun. 26, 2007 (JP) .................................. 2007-168140
Feb. 21, 2008 (JP) .................................. 2008-040176

(51) Int. Cl.
 *H01M 8/10* (2006.01)
(52) U.S. Cl.
 USPC ............ 429/496; 429/479; 429/483; 429/492
(58) Field of Classification Search ........................ None
See application file for complete search history.

(56) References Cited

U.S. PATENT DOCUMENTS

2005/0031929 A1* 2/2005 Suzuki ............................. 429/33
2005/0244697 A1 11/2005 Taft, III et al.
2006/0280981 A1* 12/2006 Mehmi ............................ 429/30

FOREIGN PATENT DOCUMENTS

| CA | 2 292 703 A1 | 6/2000 |
| CA | 2 367 332 A1 | 7/2002 |
| CA | 2 494 430 A1 | 3/2006 |
| EP | 1 289 043 A1 | 3/2003 |
| JP | 2005-222736 A | 8/2005 |
| JP | 2007-149642 A | 6/2007 |
| JP | 2007149642 A * | 6/2007 |

OTHER PUBLICATIONS

C.S. Karthikeyan et al., "Polymer nanocomposite membranes for DMFC application", Journal of Membrane Science, vol. 254 (2005), pp. 139-146.

Jean-Michel Thomassin et al., "Improvement of the barrier properties of Nafion by fluoro-modified montmorillonite", Solid State Ionics, vol. 177 (2006), pp. 1137-1144.

* cited by examiner

*Primary Examiner* — Patrick Ryan
*Assistant Examiner* — Muhammad Siddiquee
(74) *Attorney, Agent, or Firm* — Foley & Lardner LLP

(57) ABSTRACT

An electrolyte membrane (11) includes: a filler (20); and a polymer electrolyte (22). A thickness of the electrolyte membrane (11) is 1 micrometer to 500 micrometer, a moisture content thereof is 10 mass % or more, and a ratio of a swelling ratio in a membrane surface direction (xy) thereof and a swelling ratio in a membrane thickness direction (z) thereof satisfies following Expression 1: where Lambda z is the swelling ratio in the membrane thickness direction (z), and Lambda xy is the swelling ratio in the membrane surface direction (xy).

$$\frac{\lambda xy}{\lambda z} < 0.3 \qquad \text{[Math. 1]}$$

12 Claims, 15 Drawing Sheets

ELECTROLYTE MEMBRANE WITH ANISOTOPIC SWELLING AND ALIGNED FILLER

TECHNICAL FIELD

The present invention relates to an electrolyte membrane, and more particularly, to an electrolyte membrane for a fuel cell.

BACKGROUND ART

In general, as fuel cells, there are a phosphoric acid fuel cell (PAFC), an alkaline fuel cell (AFC), a polymer electrolyte fuel cell (PEFC), and the like. Among them, in comparison with the other fuel cells, the polymer electrolyte fuel cell (PEFC) can be activated at normal temperature, has fewer problems on dissipation and holding of an electrolyte, and is easy to maintain. However, the polymer electrolyte fuel cell has problems that it is necessary to precisely manage moisture in an electrolyte membrane thereof, and the like. Such management of the moisture in the electrolyte membrane is an important subject, and it is essential to manage the moisture in the electrolyte membrane in order that the electrolyte membrane can have good proton conductivity in a state of containing the moisture therein. Accordingly, in general, the electrolyte membrane is kept in such a moisture-containing state by means of a humidifier and the like. Here, when a thickness of the electrolyte membrane is thin, it is easy for the electrolyte membrane to maintain the moisture-containing state, and the electrolyte membrane can suppress a membrane resistance thereof. On the other hand, the thin electrolyte membrane has had a problem that a mechanical strength thereof is decreased.

As a technology for solving such a problem, a hydrocarbon electrolyte membrane into which filler is dispersed is disclosed in Japanese Patent Unexamined Publication No. 2005-222736. In this electrolyte membrane, a high strength is brought up by the filler, and swelling is suppressed in the entirety thereof. Accordingly, a stress in each cell is decreased, whereby mechanical durability of the electrolyte membrane in the fuel cell is enhanced.

Incidentally, the electrolyte membrane of the fuel cell shrinks in a dry environment, and swells in a wet environment. In the fuel cell, an electrode catalyst layer is coated on the electrolyte membrane. Then, the electrolyte membrane is assembled together with a gas diffusion layer and a separator having a flow passage that flows gas therethrough and having a rib that conducts electrons therethrough. Finally, these components which are the electrolyte membrane, the gas diffusion layer and the separator are stacked on one another at a surface pressure of 0.1 MPa to 2 MPa. Therefore, the electrolyte membrane is operated while the entire surface thereof is being dynamically restricted. Under such conditions where the electrolyte membrane is used, the electrolyte membrane cannot freely swell or shrink following that it is dried or humidified as being operated. Accordingly, a swelling stress or a shrinking stress occurs. Moreover, with regard to both of the swelling stress and the shrinking stress, local concentration thereof is caused by a distribution of a compressive stress. Here, the distribution of the compressive stress is caused by a fine step difference, pinhole and surface roughness of the electrode catalyst layer coated on the surface of the electrolyte membrane, by a thickness distribution of the gas diffusion layer, by a shape of the flow passage of the separator, or by a shape of the rib. When the electrolyte membrane repeatedly swells and shrinks in such an environment of being applied with the stress, a crack occurs in the electrolyte membrane. A progress of the crack finally results in a fracture of the electrolyte membrane.

DISCLOSURE OF INVENTION

In accordance with the technology described in Japanese Patent Unexamined Publication No. 2005-222736, certainly, it is possible to enhance the mechanical durability of the electrolyte membrane by dispersing the filler thereinto. However, on the other hand, the electrolyte membrane is undesirably suppressed from swelling in all directions in accordance with the technology concerned. As a result, the electrolyte membrane has a problem that a moisture content itself thereof is decreased, leading to a decrease of proton conductivity. Moreover, when the swelling of the electrolyte membrane is suppressed uniformly in all the directions, an elastic modulus of the electrolyte membrane is undesirably enhanced in all the directions, and the swelling stress and the shrinking stress, which are caused by the swelling and shrinking of the electrolyte membrane, are increased, leading to a possibility to decrease the durability on the contrary.

In this connection, it is an object of the present invention to provide an electrolyte membrane that maintains the moisture content thereof and is excellent in proton conductivity and mechanical strength.

According to one aspect of the present invention, there is provided an electrolyte membrane comprising: a membrane body comprising: a filler; and a polymer electrolyte, wherein a thickness of the membrane body is 1 micrometer to 500 micrometer, a moisture content thereof is 10 mass % or more, and a ratio of a swelling ratio in a membrane surface direction thereof and a swelling ratio in a membrane thickness direction thereof satisfies following Expression 1:

$$\frac{\lambda xy}{\lambda z} < 0.3 \qquad [\text{Math. 1}]$$

where Lambda z is the swelling ratio in the membrane thickness direction, and Lambda xy is the swelling ratio in the membrane surface direction.

BEST MODE FOR CARRYING OUT THE INVENTION

By using the drawings, a description will be made below in detail of an electrolyte membrane of the present invention and a membrane electrode assembly using the electrolyte membrane.

Figure 1:
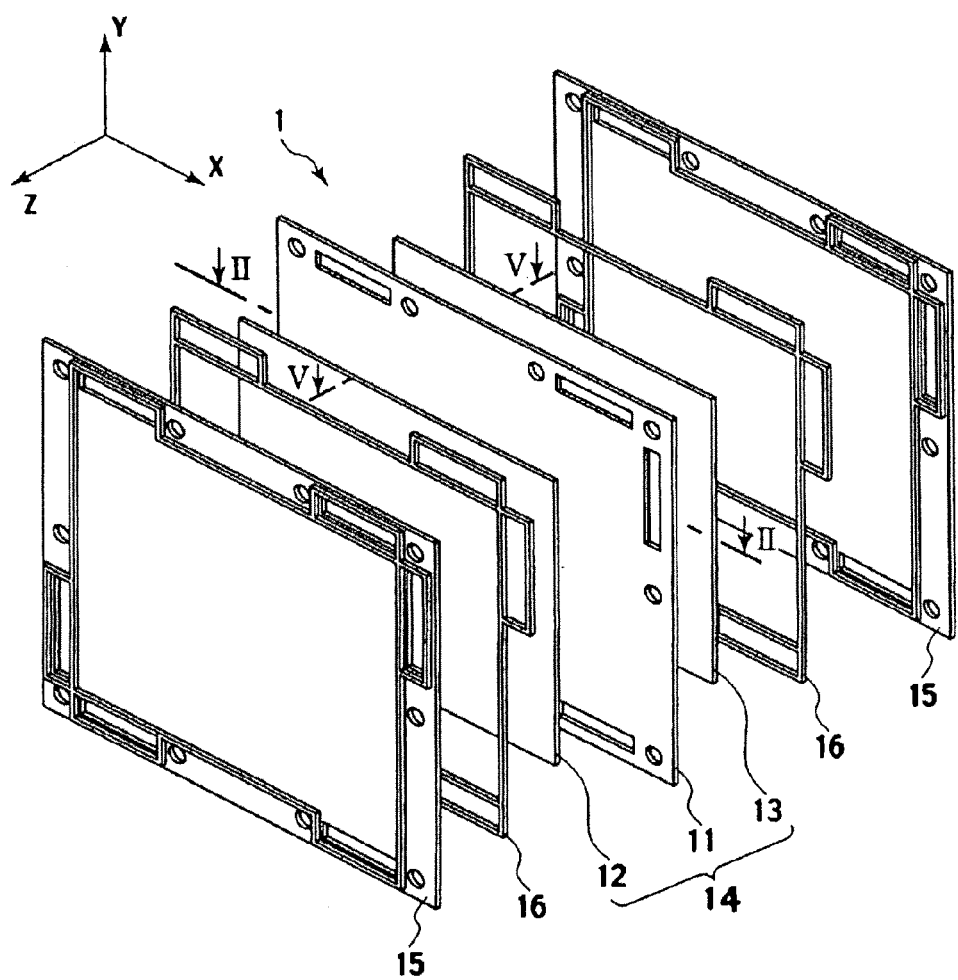
FIG. 1 is an exploded perspective view showing an embodiment of a fuel cell of the present invention.

FIG. 1 is an exploded perspective view showing a structure of a single cell 1 of a polymer electrolyte fuel cell according to an embodiment of the invention of this application. The single cell 1 includes a membrane electrode assembly 14 composed of: an electrolyte membrane 11; an anode electrode (fuel electrode) 12 that is composed of a gas diffusion layer and an anode catalyst layer, and is disposed on one surface of the electrolyte membrane 11; and a cathode electrode (air electrode) 13 that is composed of a gas diffusion layer and a cathode catalyst layer, and is disposed on the other surface of the electrolyte membrane 11. Moreover, the membrane electrode assembly 14 is sandwiched by two electrically-conductive separators 15 in which flow passages for supplying fuel gas to the anode electrode 12 and for supplying oxidant gas to the cathode electrode 13 are formed. Note that gas seals 16 are interposed between the electrolyte membrane 11 and the separators 15.

The electrolyte membrane 11 of the present invention is an electrolyte membrane, including a membrane body including: filler; and a polymer electrolyte, wherein a thickness of the membrane body is 1 micrometer to 500 micrometer ($10^{-6}$ m), a moisture content is 10 mass % or more, and a ratio of a swelling ratio in a membrane surface direction xy and a swelling ratio in a membrane thickness direction z satisfies the following Expression 2 (Math 2):

$$\frac{\lambda xy}{\lambda z} < 0.3 \qquad \text{[Math. 2]}$$

where Lambda z is the swelling ratio in the membrane thickness direction z, and Lambda xy is the swelling ratio in the membrane surface direction xy.

In accordance with the present invention, a balance between the swelling ratio in the membrane surface direction xy and the swelling ratio in the membrane thickness direction z is controlled, whereby swelling in the membrane surface direction xy is suppressed efficiently with a smaller amount of the filler than in the conventional example. In such a way, stresses caused by the swelling and shrinking of the electrolyte membrane in the fuel cell are reduced, thus making it possible to enhance durability of the electrolyte membrane. Note that, based on the swelling ratio when the electrolyte membrane contains moisture and on an elastic modulus obtained by a tensile test, it is assumed that such a swelling stress and a shrinking stress in the membrane surface direction xy reach several millipascals (MPa) to several hundred millipascals (MPa).

Figure 2:
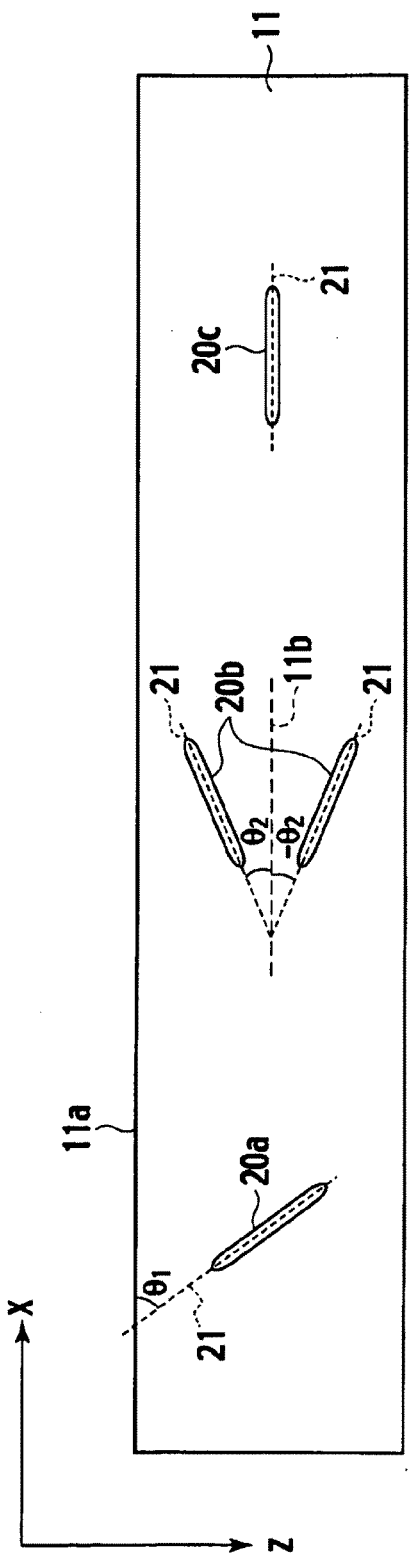
FIG. 2 is a cross-sectional view along a line II-II of FIG. 1.

In order to control the balance between the swelling ratio in the membrane surface direction xy of the electrolyte membrane 11 and the swelling ratio in the membrane thickness direction z of the electrolyte membrane 11, a direction where the filler is oriented in the electrolyte membrane 11 just needs to be set at directions other than that perpendicular to the surface direction x of the electrolyte membrane 11. A specific example of setting such an orientation direction will be described by using FIG. 2. FIG. 2 is a cross-sectional view along a line II-II of FIG. 1. Note that, in FIG. 2, a size of the filler and the thickness of the electrolyte membrane are exaggerated for the purpose of explaining the orientation of the filler. As shown in FIG. 2, in the electrolyte membrane 11, it is preferable that an angle theta 1 made by a center axis 21 in a longitudinal direction of filler 20a and a side surface 11a of the electrolyte membrane 11 should not be 90 degrees.

Instead of the above, it is preferable that the filler in the electrolyte membrane 11 be oriented within a predetermined angle range with respect to the surface direction x of the electrolyte membrane 11. Specifically, with respect to the surface direction x of the electrolyte membrane 11, the filler is oriented preferably within plus or minus 45 degrees, more preferably within plus or minus 30 degrees, still more preferably within plus or minus 15 degrees. More specifically, as shown in FIG. 2, an angle theta 2 made by a center axis 21 in a longitudinal direction of filler 20b and a surface 11b parallel to the side surface 11a is preferably within 45 degrees, more preferably within 30 degrees, still more preferably within 15 degrees.

Note that the filler may also be oriented parallel to the surface direction x of the electrolyte membrane. In this case, the filler will be oriented in a direction of substantial 0 degree with respect to the surface direction x of the electrolyte membrane. Specifically, as shown in FIG. 2, the center axis 21 in the longitudinal direction of the filler 20c and the side surface 11a may be parallel to each other in the electrolyte membrane 11.

In the case of attempting to suppress the swelling of the electrolyte membrane over all directions thereof, it is necessary to add a large amount of the filler to the electrolyte membrane in order to obtain a swelling suppression effect to an extent where it is possible to enhance the durability of the electrolyte membrane. When the large amount of filler is added to the electrolyte membrane, a volume ratio of an electrolyte in the electrolyte membrane is reduced, resulting in that proton conductivity of the electrolyte membrane is decreased. Moreover, a stress on an interface between the filler and such a polymer electrolyte is increased, causing a possibility that interface peeling may occur. For such a problem, the filler is oriented in the surface direction of the electrolyte membrane as described above, whereby the effect of suppressing the swelling of the filler can be exerted efficiently. As a result, it becomes possible to ensure the proton conductivity of the electrolyte membrane while suppressing an occurrence of such problems as the reduction of the volume ratio of the electrolyte in the electrolyte membrane and as the interface peeling therein.

In the electrolyte membrane of the present invention, the swelling ratio thereof in the membrane thickness direction z is larger than the swelling ratio thereof in the membrane surface direction xy. Moreover, a value of the ratio of the swelling ratio in the membrane surface direction with respect to the swelling ratio in the membrane thickness direction is less than 0.3. Furthermore, as shown in FIG. 2, the filler 20b is oriented within the angle range of plus or minus 45 degrees with respect to the surface direction x of the electrolyte membrane 11. In accordance with such a mode, the electrolyte membrane 11 can swell in the thickness direction z, and accordingly, the decrease of the moisture content is suppressed, and the decrease of the proton conductivity is prevented. Moreover, the filler itself can be displaced in the membrane thickness direction z. Accordingly, such an interface stress between the filler and the polymer electrolyte, which is applied therebetween at the time when the electrolyte membrane swells and shrinks is relieved, and it is possible to prevent the interface peeling and a fracture of the filler. Note that, in this description, the swelling ratio in the membrane thickness direction z is also represented as Lambda z, and the swelling ratio in the membrane surface direction xy is also represented as Lambda xy. Moreover, in this description, the ratio of the swelling ratio (Lambda xy) in the membrane surface direction with respect to the swelling ratio (Lambda z) in the membrane thickness direction is also referred to as "swelling anisotropy".

Note that the "swelling ratio (%)" in this description is represented as in Expression 3 (Math 3). As a value of the swelling ratio, values measured by methods described in examples to be described later are employed.

$$\text{Swelling ratio (\%)} = \frac{(\text{membrane dimension when immersed}) - (\text{membrane dimension when dried})}{(\text{membrane dimension when dried})} \times 100 \quad [\text{Math. 3}]$$

The value of the ratio of the swelling ratio (Lambda xy) in the membrane surface direction with respect to the swelling ratio (Lambda z) in the membrane thickness direction is less than 0.3, preferably 0 to less than 0.1, more preferably 0 to less than 0.05.

A specific form of the filler for use in the present invention is not particularly limited. However, it is preferable that the filler be a long-length one. The filler may be a three-dimensionally long-length one like a rugby ball, or may be a flat long-length one. Among them, a needle-like one in which a length is longer than a diameter (that is, needle-like filler) is particularly preferable.

Figure 3:
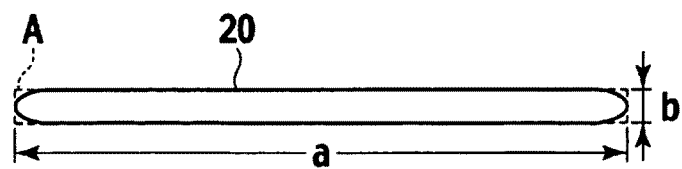
FIG. 3 is a schematic view for explaining a major axis and minor axis of filler.

An aspect ratio of the filler of the present invention is not particularly limited; however, the aspect ratio is preferably 1 to 1000, more preferably 10 to 500, particularly preferably 10 to 150. When the aspect ratio of the filler is a value equal to or more than the above-described lower limit values, a sufficient effect of the swelling anisotropy can be revealed. In consideration only for the effect of the swelling anisotropy, a larger aspect ratio of the filler is preferable. However, it is preferable that the aspect ratio of the filler be a value equal to or less than the above-described upper limit values in consideration for dispersibility of the filler in the electrolyte membrane. Note that it is possible to calculate the value of the aspect ratio from values obtained by measuring a filler thickness (also referred to as minor axis or diameter) and a filler length (also referred to as major axis). As a measurement method of such a filler thickness and filler length, there is mentioned a method of measuring lengths of the major axes and minor axes of fillers in representative samples, which are observed in several to several ten viewing fields from images of a transmission electron microscope. Note that, in this measurement method, significant differences occur in the filler thickness and the filler length depending on the observed samples and the viewing fields. Note that, supposing a rectangle A having the smallest area among rectangles circumscribing the target filler 20 in such a microscope image as shown in FIG. 3, the major axis stands for a long side a of the rectangle A. Moreover, the minor axis stands for a short side b of the rectangle A having the smallest area. Moreover, the aspect ratio refers to a value of a ratio of the length of the major axis with respect to the length of the minor axis, that is, a ratio of a/b.

An average diameter (average thickness) of the filler is not particularly limited, either; however, the average diameter is preferably 0.001 micrometer to 10 micrometer ($10^{-6}$ m), more preferably 0.01 micrometer to 5 micrometer, still more preferably 0.1 micrometer to 1 micrometer, particularly preferably 0.1 micrometer to 0.2 micrometer. If the average diameter of the filler is equal to or more than the lower limit values of the above-described ranges, then aggregation of the filler at the time of dispersion is suppressed, a decrease of a surface area thereof is prevented, and the effects of the invention of this application can be exerted sufficiently. Moreover, if the average diameter of the filler is equal to or less than the upper limit values of the above-described ranges, then it is possible to prevent an occurrence of problems after a complexing reaction, such as an increase of the membrane thickness and an expansion of a membrane thickness distribution. Note that, unless the object of the invention of this application is impaired, plate-like filler and hollow filler may be used.

A content of the filler in the electrolyte membrane of the present invention is preferably 1 wt % to 90 wt %, more preferably 2.5 wt % to 30 wt %, still more preferably 5 wt % to 25 wt %, particularly preferably 10 wt % to 20 wt % with respect to a total amount of the filler and the polymer electrolyte. If the content of the filler is a value within such ranges as described above, then the filler reveals sufficient swelling anisotropy, whereby it is possible to reduce the stress caused by the swelling and the shrinking. As a result, it becomes possible to enhance the durability of the electrolyte membrane, and a tearing strength thereof is also enhanced.

A constituent material of the filler for use in the present invention is not particularly limited; however, the constituent material is preferably an inorganic compound, more preferably an inorganic oxide. Specifically, the constituent material is particularly preferably one selected from the group consisting of titania, potassium titanate, silica, silica-alumina, zirconia, and boehmite. Among them, from viewpoints of an aspect ratio, heat resistance, chemical stability and the like, titania and silica-alumina are preferably used, and titania is particularly preferably used. The inorganic compound is stable in an operation environment of the fuel cell, for example, at a high humidity and a high temperature. Moreover, the inorganic compound is also stable against radicals. Therefore, if the inorganic compound is used as the constituent material of the filler, then, even if the fuel cell is operated for a long period of time, the material of the filler is not deteriorated in quality, and the filler can reveal the effect of the swelling anisotropy. Note that, as the filler, only one type thereof may be singly used, two or more types thereof may be used in combination, or a composite oxide of two types or more of the above-described materials may be used.

It is preferable that the filler according to the present invention be subjected to surface treatment by an acid. As the acid for use in the surface treatment of the filler, a publicly known substance can be used without any particular limitations. For example, there can be mentioned benzenesulfonic acid, para-toluenesulfonic acid, methanesulfonic acid, phenylboric acid Ph-B(OH)$_2$, phenylacetic acid, and the like. As a method of performing the surface treatment for the filler, a method is preferable, in which the filler is added to a solution of the above-described acid in a mass ratio of 0.1 mass % to 30 mass %, and is reacted therewith under conditions where a reaction time is 1 hour to 10 hours and a reaction temperature is 50 degrees Celsius to 90 degrees Celsius. When the filler is brought into contact with the acid as described above, hydroxyl groups of the filler surface and end hydroxyl groups of the acid make interaction in a hydrogen bonding manner. Since it is confirmed that the acid molecules are gradually eliminated from the filler surface as the filler is washed by water, bond between the filler and the acid seems as weak as coordinate bond without actually reaching hydrogen bond. The filler surface is modified by the acid as described above, whereby benzene and CH$_3$ sides of molecules of the acid become likely to be compatible with solvent molecules, and become likely to be dispersed in an organic solvent such as NMP. As a result, a decrease of mechanical characteristics, which particularly results from insufficient dispersibility of the filler, that is, the decrease of the tearing strength of the filler, which is caused by the aggregation thereof, can be prevented.

The polymer electrolyte composing the electrolyte membrane of the present invention is not particularly limited. The polymer electrolyte is broadly divided into a fluorine polymer electrolyte containing fluorine atoms in all or part of a polymer skeleton thereof, and into a hydrocarbon polymer electrolyte containing no fluorine atoms in a polymer skeleton thereof; however, both of the fluorine polymer electrolyte and the hydrocarbon polymer electrolyte may be used.

As suitable examples of the fluorine polymer electrolyte, specifically, there are mentioned: a perfluorocarbon sulfonic acid polymer, such as Nafion (registered trademark, made by DuPont Corporation), Aciplex (registered trademark, made by Asahi Kasei Corporation), and Flemion (registered trademark, made by Asahi Glass Co., Ltd.); a polytrifluorostyrene sulfonic acid polymer; a perfluorocarbon phosphonic acid polymer; a trifluorostyrene sulfonic acid polymer; an ethylenetetrafluoroethylene-9-styrene sulfonic acid polymer; an ethylene-tetrafluororoethylene copolymer; a polyvinylidene fluoride-perfluorocarbon sulfonic acid polymer, and the like.

Moreover, also as the hydrocarbon polymer electrolyte, a publicly known hydrocarbon electrolyte is used without any particular limitations. Specifically, there are used hydrocarbon resin having sulfonic acid groups, a material in which an inorganic acid such as phosphoric acid is doped into a hydrocarbon polymer compound, an organic/inorganic hybrid polymer in which a part is substituted by functional groups of a proton conductor, a proton conductor in which a phosphoric acid solution or a sulfuric acid solution is impregnated into a polymer matrix, and the like. However, in consideration for oxidation resistance, low gas permeability, production easiness, low cost, and the like, the hydrocarbon resin having the sulfonic acid groups is preferable. As the hydrocarbon polymer electrolyte for use in the present invention, a publicly known hydrocarbon polymer electrolyte is used without any particular limitations. For example, as suitable examples of the hydrocarbon polymer electrolyte, there are mentioned sulfonated polyaryl ether sulfone (S-PES), polybenzimidazole (PBI), polybenzoxazole (PBO), sulfonated polyphenoxybenzoyl phenylene (S-PPBP), polyether ether ketone, sulfonamide polyethersulfone, sulfonated polyether ether ketone (S-PEEK), sulfonamide polyether ether ketone, sulfonated crosslinked polystyrene, sulfonamide crosslinked polystyrene, sulfonated polytrifluorostyrene, sulfonamide polytrifluorostyrene, sulfonated polyaryl ether ketone, sulfonamide polyaryl ether ketone, sulfonated poly(aryl ether sulfone), sulfonamide poly(aryl ether sulfone), polyimide, sulfonated polyimide, sulfonamide polyimide, sulfonated 4-phenoxybenzoyl-1,4-phenylene, sulfonamide 4-phenoxybenzoyl-1,4-phenylene, phosphonated 4-phenoxybenzoyl-1, 4-phenylene, sulfonated polybenzimidazole, sulfonamide polybenzoimidazole, phosphonated polybenzoimidazole, sulfonated polyphenylene sulfide, sulfonamide polyphenylene sulfide, sulfonated polybiphenylene sulfide, sulfonamide polybiphenylene sulfide, sulfonated polyphenylene sulfone, sulfonamide polyphenylene sulfone, sulfonated polyphenoxybenzoyl phenylene, sulfonated polystyrene-ethylene-propylene, sulfonated polyphenylene imide, polybenzoimidazole-alkyl sulfonic acid, sulfoarylated polybenzoimidazole, sulfonated styreneethylene-butadiene-styrene copolymer (S-SEBS) and the like. These hydrocarbon electrolytes are preferably used from production viewpoints that raw materials are inexpensive, that a production process is simple, and that selectivity of the materials is high.

Note that, with regard to the above-described polymer electrolyte (ion exchange resin), only one type thereof may be singly used, or two or more types thereof may be used in combination. Moreover, the polymer electrolyte is not limited only to the above-described materials, and other materials may be used.

Figure 4:
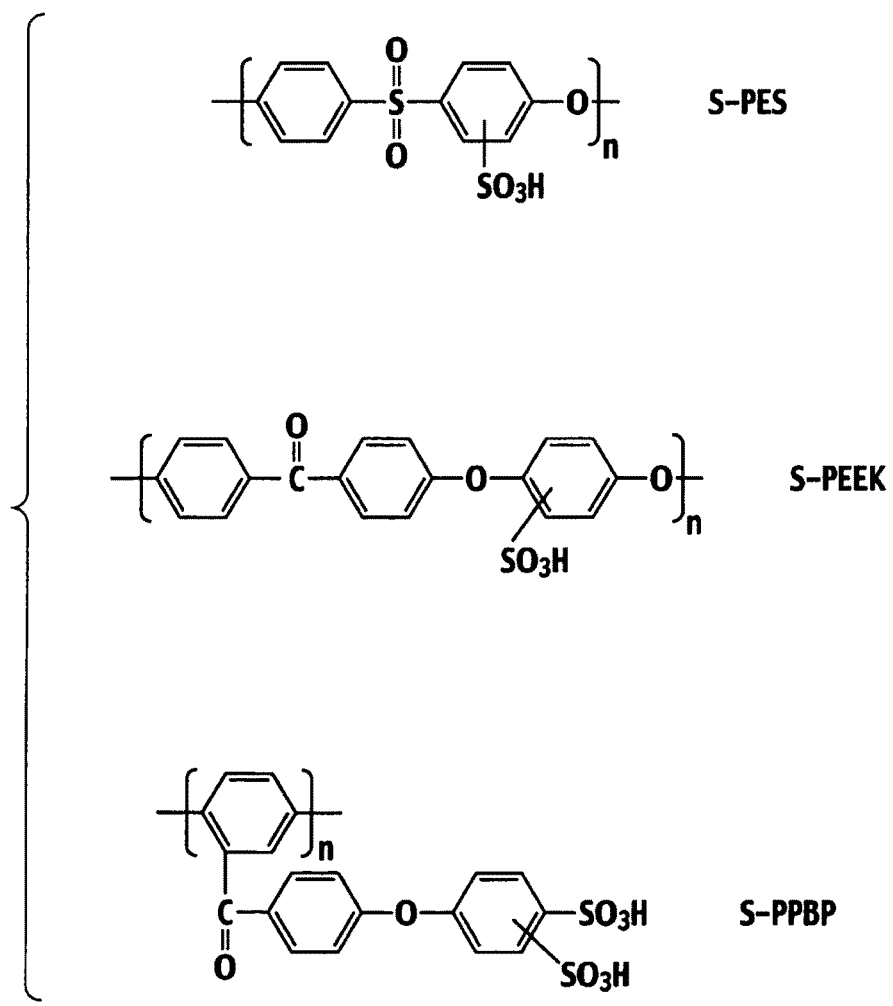
FIG. 4 is diagrams showing chemical formulas of sulfonated polyaryl ether sulfone (S-PES), sulfonated polyether ether ketone (S-PEEK), and sulfonated polyphenoxybenzoyl phenylene (S-PPBP).

Moreover, as shown in FIG. 4, as the polymer electrolyte according to the present invention, there are preferably used fluorine electrolytes such as sulfonated polyaryl ether sulfone (S-PES), sulfonated polyether ether ketone (S-PEEK), sulfonated polyphenoxybenzoyl phenylene (S-PPBP), Nafion (registered trademark, made by DuPont Corporation), Aciplex (registered trademark, made by Asahi Kasei Corporation), and Flemion (registered trademark, made by Asahi Glass Co., Ltd.). Ion exchange capacities of the respective electrolytes are preferably 0.1 meq/g to 3 meq/g, more preferably 0.9 meq/g to 2.5 meq/g.

A content of the polymer electrolyte in electrolyte membrane of the present invention is preferably 10 wt % to 99 wt %, more preferably 70 wt % to 97.5 wt %, still more preferably 75 wt % to 95 wt %, particularly preferably 80 wt % to 90 wt % with respect to the total amount of the filler and the polymer electrolyte. If the content of the polymer electrolyte is a value within the above-described ranges, then the aggregation of the filler is suppressed, whereby it is possible to sufficiently ensure desired swelling anisotropy while preventing the decrease of dynamic properties such as the tearing strength.

The thickness of the electrolyte membrane of the present invention is 1 micrometer to 500 micrometer, preferably 5 micrometer to 100 micrometer, more preferably 10 micrometer to 30 micrometer. If the thickness of the electrolyte membrane is out of the range of 1 micrometer to 500 micrometer, then the durability of the fuel cell is sometimes decreased owing to the decrease of the mechanical strength. Moreover, performance of the fuel cell is sometimes decreased owing to an increase of proton conduction resistance. Accordingly, it is not preferable that the thickness of the electrolyte membrane be out of the above-described range.

The moisture content of the electrolyte membrane of the present invention is not particularly limited; however, is preferably 1 mass % to 30 mass %, more preferably 5 mass % to 20 mass %, particularly preferably 10 mass % to 20 mass %. If the moisture content of the electrolyte membrane is a value equal to or more than the above-described lower limit values, then it is possible to prevent the increase of the proton conduction resistance and the decrease of the performance of the fuel cell, which follows the increase of the proton conductive resistance. Moreover, if the moisture content of the electrolyte membrane is a value equal to or less than the above-described upper limit values, then it is possible to prevent the decrease of the performance of the fuel cell owing to the increase of the swelling ratio, a blockage of the flow passages, and inhibition of the gas diffusion. Here, the blockage and the inhibition follow the increase of the swelling ratio.

A production method of the electrolyte membrane according to the present invention is not particularly limited as long as the production method is a publicly known method capable of setting, at less than 0.3, the value of the ratio (swelling anisotropy) of the swelling ratio (Lambda xy) in the membrane surface direction with respect to the swelling ratio (Lambda z) in the membrane thickness direction. As an example, there is mentioned a method of orienting the filler within a predetermined angle range in the surface direction of the electrolyte membrane. For example, the angle range is a range within plus or minus 45 degrees, at which the filler is oriented with respect to the surface direction of the electrolyte membrane. Specifically, there are mentioned a method of forming the electrolyte membrane from solution states of the polymer electrolyte and the filler, a method of forming the electrolyte membrane from molten states of the polymer electrolyte and the filler, and the like. Moreover, there is mentioned a method, in which the polymer electrolyte or a precursor (monomer, oligomer or the like) thereof containing the filler is used in a solution state or a molten state, and the electrolyte membrane is formed from the polymer electrolyte or the precursor by using, for example, a calendar method, an inflation method, a T-die method, a cast method or the like. Furthermore, the technical scope of the invention of this application is not limited to the specific methods described in this description.

A speed of forming the electrolyte membrane according to the present invention is preferably 1 cm/min to 1000 cm/min, more preferably 3 cm/min to 500 cm/min, particularly preferably 5 cm/min to 100 cm/min. If the electrolyte membrane is formed at a membrane-forming speed within such ranges as described above, then it becomes possible to orient the filler dispersed in the solution in the surface direction of the electrolyte membrane, and to allow the filler to reveal the swelling anisotropy to a better extent. As a result, it becomes possible to enhance the durability of the electrolyte membrane.

Specifically, in the case of orienting the filler within the predetermined angle range (within plus or minus 45 degrees) with respect to the surface direction of the electrolyte membrane, for example, the polymer electrolyte and the filler, and a solvent according to needs, are first mixed together, whereby an electrolyte solution is prepared. Thereafter, a predetermined amount of the electrolyte solution is dropped on a substrate, and is formed into a smooth surface shape at a membrane-forming speed within a predetermined range so that a thickness of the electrolyte membrane thus obtained can be uniform. Then, the filler in the electrolyte solution is oriented in a predetermined inclined state with respect to the smoothened surface (that is, the surface of the electrolyte membrane).

The above will be described more in detail. In the case of forming the electrolyte membrane into the smooth surface shape so that the thickness thereof can be uniform after dropping the electrolyte solution on the substrate, naturally, force to spread the electrolyte solution also affects the filler in the electrolyte solution. Hence, the filler is inclined in a direction of the force. Moreover, the angle of the filler with respect to the surface direction of the electrolyte membrane can be controlled by adjusting viscosity of the electrolyte solution, the membrane thickness to be obtained by this processing, the membrane-forming speed, and the like. As a specific membrane-forming method, for example, there is mentioned a method using K101 CONTROL COATER made by RK Print Coat Instrument Ltd. and an applicator made of stainless steel. However, the technical scope of the present invention is not limited only to the case of using these devices.

The substrate on which the electrolyte solution is dropped for the purpose of spreading the electrolyte solution is not particularly limited, and just needs to be a flat one. For example, there are mentioned a plate in which a Teflon sheet is pasted on a glass substrate, and the like. Moreover, the solvent for use in the electrolyte solution is selected as appropriate in accordance with the electrolyte for use, the filler for use, and concentrations thereof, and is not particularly limited. For example, as the solvent, there are mentioned dimethyl formamide, dimethyl sulfoxide, N-methylpyrrolidone (NMP), lower alcohols (methanol, ethanol, isopropyl alcohol), acetone, methyl ethyl ketone, methyl isobutyl ketone, and the like.

A concentration of the polymer electrolyte in the electrolyte solution is preferably 1 mass % to 90 mass %, more preferably 5 mass % to 50 mass %, still more preferably 10 mass % to 30 mass %, with respect to a total mass of the electrolyte solution. Moreover, a content of the filler in the electrolyte solution is preferably 0.01 mass % to 30 mass %, more preferably 0.1 mass % to 10 mass %, still more preferably 1 mass % to 10 mass %, with respect to the total mass of the electrolyte solution. Furthermore, a content of the solvent in the electrolyte solution is preferably 1 mass % to 98 mass %, more preferably 30 mass % to 94 mass %, still more preferably 60 to 89 mass %, with respect to the total mass of the electrolyte solution.

In accordance with the present invention, the filler (particularly, needle-like filler) in which the aspect ratio is adjusted is oriented in the surface direction of the electrolyte membrane by the above-described membrane-forming method. Accordingly, the swelling in the surface direction of the filler can be suppressed efficiently by means of a smaller content of the filler than heretofore. As a result, the volume ratio of the electrolyte itself is hardly decreased, whereby the durability of the electrolyte membrane can be enhanced while suppressing the decrease of the performance of the fuel cell.

Moreover, by the filler oriented in the surface direction of the electrolyte membrane, the anisotropy is also revealed between the elastic modulus in the surface direction of the electrolyte membrane and the elastic modulus in the thickness direction of the electrolyte membrane. Specifically, though depending on the content of the filler, in the electrolyte membrane containing the filler, the elastic modulus in the membrane surface direction thereof is increased largely and the elastic modulus in the membrane thickness direction thereof is not increased very largely in comparison with an electrolyte membrane (comparative membrane) having no filler. Accordingly, though the swelling ratio in the membrane surface direction is decreased largely, the swelling ratio in the membrane thickness direction is increased largely in comparison with the comparative film, and the total moisture content becomes substantially equivalent to that of the comparative membrane. Specifically, elasticity in the membrane thickness direction is lowered than that in the membrane surface direction, whereby the swelling when the moisture is contained in the electrolyte membrane is caused in the membrane thickness direction. In such a way, the swelling anisotropy only in the surface direction of the electrolyte membrane can be obtained without inhibiting the proton conduction that requires the moisture. Moreover, the needle-like filler can move easily in the membrane thickness direction when the electrolyte polymer swells in the membrane thickness direction. Accordingly, the interface stress between the electrolyte polymer and the needle-like filler is smaller, and the interface peeling between the polymer of the electrolyte membrane and the needle-like filler is less likely to occur. When the filler is oriented randomly, the filler becomes incapable of easily moving in the membrane thickness direction, and becomes incapable of swelling. Then, a large internal stress (interface stress) acts between the electrolyte polymer and the needle-like filler, and the interface peeling between the electrolyte polymer and the needle-like filler occurs.

Note that, from the following Expression 4 (Math 4), the respective elastic moduli in the membrane surface direction and the membrane thickness direction can be calculated:

Elasticity in surface direction xy of electrolyte membrane:

$$Exy = (1-\rho) \times Ep + \rho \times Ef \quad \text{[Math.4]}$$

Elasticity in thickness direction z of electrolyte membrane:

$$Ez = \left[ \frac{\rho}{Ep} + \frac{1-\rho}{Ef} \right]^{-1}$$

where Rho is the volume ratio of the filler, Ep is the elastic modulus of the electrolyte membrane, and Ef is the elastic modulus of the filler.

Here, when the swelling ratio in the membrane surface direction is a (isotropic in surface direction xy), and the swelling ratio in the membrane thickness direction is c, a volume swelling ratio Lambda v of the electrolyte membrane is represented as in Expression 5 (Math 5) showing a difference between the volume after the swelling and the volume before the swelling:

$$\lambda v = (1+a) \times (1+c) - 1 \quad \text{[Math.5]}$$

Note that swelling pressures sigma applied in the membrane surface direction and the membrane thickness direction at the time of the swelling are the same in a similar way to an internal pressure of a balloon. Hence, the following Expression 6 (Math 6) is derived:

$$\sigma_\lambda = a \times Exy = c \times Ez \quad \text{[Math.6]}$$

Then, from Expression 5 and right-side two terms of Expression 6, the following Expression 7 (Math 7) is derived:

$$\lambda = a \times \left(2 + \frac{Exy}{Ez}\right) + a^2 \times \left(1 + \frac{2Exy}{Ez}\right) + a^3 \times \left(\frac{Exy}{Ez}\right) \quad \text{[Math. 7]}$$

Here, an elastic modulus of Nafion (registered trademark, made by DuPont Corporation) as a general electrolyte material is 0.01 GPa, and an elastic modulus of needle-like titania ($TiO_2$, FTL series made by Ishihara Sangyo Kaisha, Ltd.) as the filler is 280 GMPa. Hence, if the volume ratio of the filler is set at 10%, and the volume swelling ratio is assumed to be equal to an increment of the moisture content, then, since the moisture content of Nafion is 30%, Exy becomes equal to 28.1 GPa, Ez becomes equal to 0.11 GPa, the swelling ratio c in the membrane surface direction becomes equal to 0.12%, and the swelling ratio c in the membrane thickness direction becomes equal to 29.7%, and in such a way, the swelling anisotropy is revealed.

Moreover, an elastic modulus of sulfonated polyether sulfone (S-PES) is generally 1 GPa. In a similar way to the above-descried Nafion, if needle-like $TiO_2$ (FTL series made by Ishihara Sangyo Kaisha, Ltd.) is used as the filler, the volume ratio of the filler is set at 10%, and the moisture content of Nafion is set at 30%, then Exy becomes equal to 28.9 GPa, Ez becomes equal to 1.11 GPa, the swelling ratio a in the membrane surface direction becomes equal to 1.05%, and the swelling ratio c in the membrane thickness direction becomes equal to 27.3%, and in such a way, the swelling anisotropy is revealed.

Furthermore, modification of the right-side two terms of Expression 6 leads to such as Expression 8 (Math 8):

$$\frac{c}{a} = \frac{Exy}{Ez} \quad \text{[Math. 8]}$$

Here, when c/a is used as an index for gauging the swelling anisotropy, in the above-described cases, c/a becomes equal to 0.0004 in the case of using Nafion from the above-described calculation result, and c/a becomes equal to 0.04 even in the case of using sulfonated polyether sulfone therefrom. As described above, large swelling anisotropy is obtained. Here, if c/a satisfies Expression 9 (Math 9), then a considerable effect is brought up for the enhancement of the durability of the electrolyte membrane.

$$\frac{c}{a} = \frac{Exy}{Ez} < 0.3 \qquad \text{[Math. 9]}$$

Moreover, from Expression 4 and Expression 9, Expression 10 (Math 10) is established:

$$\frac{Ep \times Ef}{\rho \times (1-\rho) \times (Ep^2 - Ef^2) + (\rho^2 + \rho + 1) \times Ep \times Ef} < 0.3 \qquad \text{[Math. 10]}$$

From Expression 10, the elastic moduli of the electrolyte and the filler, which satisfy the conditions of Expression 9, and the volume ratio of the filler, can be obtained. The respective materials and the volume ratios thereof are selected by such a method, thus making it possible to reveal the selling anisotropy.

As the aspect ratio of the filler is larger, better swelling anisotropy is obtained. The filler catches the stress caused by the swelling of the electrolyte polymer, and the swelling anisotropy is revealed in the case where the filler is oriented horizontally. Here, force received per piece of the filler from the electrolyte polymer is calculated. From the following Expression 11 (Math 11), a necessary aspect ratio (L/d) of the filler thickness d and the filler length L is obtained:

$$\frac{L}{d} = \frac{1}{4} \times \frac{\sigma_f}{\sigma_p} \times 2 \qquad \text{[Math. 11]}$$

where Sigma f and Sigma p are a breaking strength of the filler and a yield strength of the electrolyte polymer, respectively.

A yield strength of Nafion (registered trademark, made by DuPont Corporation) as the electrolyte material is 10 MPa. The breaking strength of the filler is not measured in general; however, a breaking strength of the needle-like titania (TiO$_2$, FTL series made by Ishihara Sangyo Kaisha, Ltd.) is assumed to be 100 MPa to 300 MPa. The diameter of the filler (that is, the thickness of the filler) is approximately 0.2 micrometer in the case where the filler is the titania. Accordingly, as the aspect ratio of the titania as the filler, a value within a range of 14.5 to 43.5 is considered to be good. However, the aspect ratio of the filler may be varied depending also on the constituent material of the filler and the diameter thereof, and accordingly, is not limited to the above-described range.

Next, a description will be made of the tearing strength as another index for deciding the durability of the membrane. It is known that, in the membrane, the breaking strength and the tearing strength as well as the elastic modulus are enhanced in such a manner that the filler is filled thereinto. The reason for this is considered to be because energy applied for forming a crack is reduced since energy applied from the outside is used as thermal energy to be generated by interface friction among pieces of the electrolyte polymer. In actual, it has been confirmed also in the present invention that the tearing strength is enhanced.

Next, a description will be made of the membrane electrode assembly (MEA) including the above-described electrolyte membrane. The MEA is composed by using the electrolyte membrane of the present invention, thus making it possible to provide an MEA excellent in durability.

Figure 5:
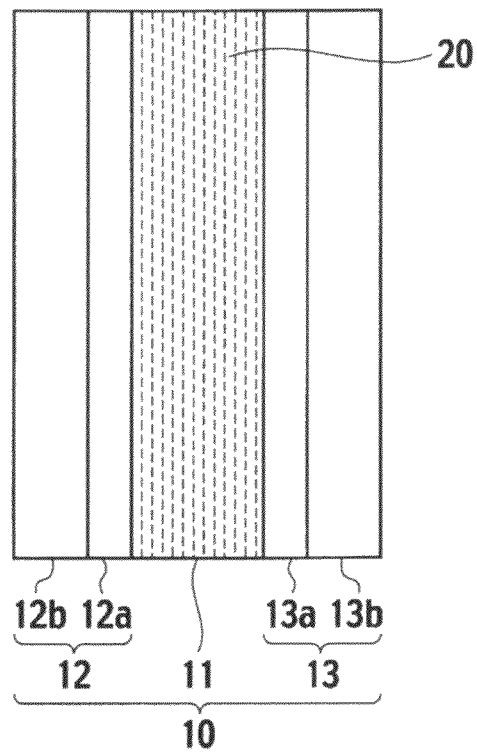
FIG. 5 is a cross-sectional view along a line V-V of FIG. 1.

As shown in FIG. 1 and FIG. 5, the "membrane electrode assembly (MEA)" in this description includes: the electrolyte membrane 11; the anode electrode 12 that is composed of the anode catalyst layer 12a and the anode gas diffusion layer 12b, and is disposed on one surface of the electrolyte membrane 11; and the cathode electrode 13 that is composed of the cathode catalyst layer 13a and the cathode gas diffusion layer 13b, and is disposed on the other surface of the electrolyte membrane 11.

Each of the anode catalyst layer 12a and the cathode catalyst layer 13a according to the present invention contains a catalyst component, a proton conductive polymer, and a water-repellent material according to needs. An electrode catalyst composing each of the electrode catalyst layers is one formed by supporting the catalyst component on an electrically-conductive material.

With regard to the catalyst components for use in the electrode catalyst layers according to the present invention, the catalyst component in the cathode catalyst layer is not particularly limited as long as it has a catalytic function for a reduction reaction of oxygen, and a publicly known catalyst can be used. Meanwhile, the catalyst component in the anode catalyst layer is not particularly limited as long as it has a catalytic function for an oxidation reaction of hydrogen, and a publicly known catalyst can be used. Specifically, the catalyst components are selected from among metals such as platinum, ruthenium, iridium, rhodium, palladium, osmium, tungsten, lead, iron, chromium, cobalt, nickel, manganese, vanadium, molybdenum, gallium and aluminum, alloys of these, and the like. Among them, an alloy at least containing the platinum is preferably used in order to enhance catalytic activity, poisoning resistance to carbon monoxide and the like, heat resistance, and the like.

With regard to a composition of the alloy, it is recommended that the platinum occupy 30 atom % to 90 atom % and metals formed into the alloy occupy 10 atom % to 70 atom % though depending on types of the metals formed into the alloy. The composition of the alloy in the case of using the alloy in the cathode catalyst differs depending on the types of the metals formed into the alloy, and can be selected as appropriate by those skilled in the art. However, it is preferable that the platinum occupy 30 atom % to 90 atom %, and that the other metals formed into the alloy occupy 10 atom % to 70 atom %. Note that, in general, the alloy is one formed by adding one or more of the other metal elements or nonmetal elements to a specific metal element, and is a generic name of a substance having metallic properties.

With regard to a texture of the alloy, there are an eutectic alloy as a so-called mixture in which component elements becomes individual crystals, a solid solution in which the component elements are completely blended together, a compound composed of the metals as the component elements, a compound of the metal and the nonmetal, which are the component elements, and the like. The present invention may adopt any of the above. In this case, the catalyst component for use in the cathode catalyst layer and the catalyst component for use in the anode catalyst layer can be selected as appropriate from among the above-described ones. In the description that follows, unless otherwise specified, explanations of the catalyst components for the cathode catalyst layer and the anode catalyst layer make a similar definition therebetween, and the catalyst components are referred to as a "catalyst component" in a lump. However, it is not necessary that the catalyst components for the cathode catalyst layer and the anode catalyst layer be the same, and the catalyst components are selected as appropriate so as to exert such desired functions as described above.

A shape and size of the catalyst component is not particularly limited, and similar shape and size to those of the publicly known catalyst components can be used; however, it is preferable that the catalyst component be granular. In this case, as an average particle diameter of the catalyst component for use in catalyst slurry is smaller, an effective electrode area on which an electrochemical reaction progresses is increased, leading to enhancement of oxygen reduction activity, and accordingly, the smaller average particle diameter is preferable. However, in actual, when the average particle diameter is too small, a phenomenon is observed that the oxygen reduction activity is decreased on the contrary. Hence, the average particle diameter of the catalyst component contained in the catalyst slurry is preferably 1 nm to 30 nm, more preferably 1.5 nm to 20 nm, still more preferably 2 nm to 10 nm, particularly preferably 2 nm to 5 nm. The average particle diameter is preferably 1 nm or more from a viewpoint of easiness of supporting the catalyst component, and is preferably 30 nm or less from a viewpoint of catalyst utilization efficiency. Note that the "average particle diameter of catalyst component" in the present invention can be measured from a crystallite diameter obtained from a full width at half maximum (FWHM) of a diffraction peak of the catalyst component in an X-ray diffraction, or measured from an average value of particle diameters of the catalyst component, which is investigated by the transmission electron microscope.

As a measurement method of the average particle diameter of the component having the catalytic activity according to the present invention, there is mentioned a method of measuring particle diameters of the particles in representative samples, which are observed in several to several ten viewing fields from images of the transmission electron microscope. Note that, in this measurement method, significant differences occur in the average particle diameter depending on the observed samples and the viewing fields. More simply, a crystallite diameter obtained from a full width at half maximum of a specific reflection peak in an X-ray diffraction profile can also be used as the average particle diameter of the catalyst component.

The average particle diameter of the component having the catalytic activity according to the present invention is calculated in the following manner. Specifically, all particle diameters of primary particles of an electrically-conductive metal, which are observed in arbitrary eight viewing fields of an image of the transmission electron microscope, are measured (sum: N>100). Then, a median value of the measured particle diameters is defined as the particle diameter of the component having the catalytic activity.

The above-described electrically-conductive material just needs to be a material having a specific surface area for supporting the catalyst component in a desired dispersed state, and having sufficient electron conductivity as a current collector, and an electrically-conductive material containing carbon as a main component is preferable. Specifically, as the electrically-conductive material, carbon particles are mentioned, which are made of carbon black, activated carbon, coke, natural graphite, artificial graphite, and the like. Moreover, more specifically, as such a carbon material, there are mentioned a material containing, as a main component, at least one selected from acetylene black, Vulcan, Ketjen Black, Black Pearl, graphitized acetylene black, graphitized Vulcan, graphitized Ketjen Black, graphitized carbon, graphitized Black Pearl, carbon nanotube, carbon nanofiber, carbon nanohorn, and carbon fibril, and the like. Note that, in the present invention, "to contain carbon as a main component" refers to that carbon atoms are contained as a main component, and is a concept incorporating both that the carbon material is composed only of carbon atoms and that the carbon material is substantially composed of the carbon atoms. Depending on the case, elements other than the carbon atoms may be contained in order to enhance the characteristics of the fuel cell. Note that "to be substantially composed of the carbon atoms" stands for that inclusion of impurities with approximately 2 mass % to 3 mass % or less is permitted.

Such a BET specific surface area of the electrically-conductive material just needs to be a specific surface area for supporting the catalyst component in a highly dispersed state; however, is recommended to be preferably 20 $m^2/g$ to 1600 $m^2/g$, more preferably 80 $m^2/g$ to 1200 $m^2/g$. If the specific surface area is less than 20 $m^2/g$, then dispersibilities of the catalyst component and the proton conductive polymer into the electrically-conductive material are decreased, causing an apprehension that sufficient power generation performance may not be obtained. If the specific surface area exceeds 1600 $m^2/g$, then there is an apprehension that the effective utilization efficiencies of the catalyst component and the proton conductive polymer may be decreased on the contrary.

Moreover, a size (average particle diameter) of the electrically-conductive material is not particularly limited; however, is recommended to be preferably 5 nm to 200 nm, more preferably 10 nm to 100 nm, from viewpoints of supporting easiness thereof, the catalyst utilization rate, an appropriate control for the thickness of the electrode catalyst layer, and the like.

In the electrode catalyst in which the catalyst component is supported on the electrically-conductive material, a supported amount of the catalyst component is recommended to be set at preferably 10 mass % to 80 mass %, more preferably 30 mass % to 70 mass %, with respect to the total amount of the electrode catalyst. If the supported amount exceeds 80 mass %, then the dispersibility of the catalyst component on the electrically-conductive material is decreased, causing an apprehension that en economical advantage may be decreased since the power generation performance is not enhanced so much as the supported amount is increased. Meanwhile, if the supported amount is less than 10 mass %, then the catalytic activity per unit mass is decreased to cause a demand for a large amount of the electrode catalyst in order to obtain desired power generation performance, and this is not preferable. Note that the supported amount of the catalyst component can be investigated by inductively coupled plasma emission spectrometry (ICP).

Besides the electrode catalyst, the polymer electrolyte is contained in the cathode catalyst layer and the anode catalyst layer (hereinafter, also referred to simply as "catalyst layers") according to the present invention. As the proton conductive polymer in each of the electrode catalyst layers according to the present invention, a publicly known polymer can be used without any particular limitations; however, a similar material to that of the polymer electrolyte for use in the electrolyte membrane of the present invention can be used, and the proton conductive polymer just needs to be made of a material having at least high proton conductivity. The polymer electrolyte usable in this case is broadly divided into a fluorine polymer electrolyte containing fluorine atoms in all or part a polymer skeleton thereof, and into a hydrocarbon polymer electrolyte containing no fluorine atoms in a polymer skeleton thereof. Specific examples of the polymer electrolyte are similar to those of the polymer electrolyte, and accordingly, are omitted here.

Moreover, the catalyst component can be supported on the electrically-conductive material by a publicly known method. For example, such publicly known methods as an impregnation method, a liquid-phase reduction/support method, an evaporation to dryness method, a colloid adsorption method, a spray thermal decomposition method, and a reversed micelle (microemulsion) method can be used. Moreover, as the electrode catalyst, a commercially available article may be used.

Note that the polymer electrolyte for use may differ in between the electrolyte membrane and the electrode catalyst layer according to the present invention; however, is preferably the same in consideration for contact resistance of the membrane and the electrode.

As a polymer that plays a role of an adhesive, the polymer electrolyte is preferably coated on the electrode catalyst. In such a way, a structure of the electrode can be stably maintained, and in addition, a three-phase interface where the electrode reaction progresses is ensured sufficiently, whereby high catalytic activity can be obtained. The content of the polymer electrolyte contained in the electrode is not particularly limited; however, is recommended to be set at 25 mass % to 35 mass % with respect to the total amount of the catalyst component.

A porosity of the electrode catalyst layer is preferably 30% to 70%, more preferably 40% to 60%. If the porosity is less than 30%, then diffusion of the gas is not sufficient, and a cell voltage in a high current range is decreased. Meanwhile, if the porosity exceeds 70%, then the strength of the electrode catalyst layer is not sufficient.

Moreover, the thickness of the electrode catalyst layer in the case of using the electrode catalyst according to the present invention for the membrane electrode assembly (MEA) is recommended to be set at preferably 0.1 micrometer to 100 micrometer, more preferably 1 micrometer to 10 micrometer.

As a material to be used for the gas diffusion layer (hereinafter, referred to as GDL) according to the present invention, a sheet-like material is proposed, which is composed of carbon paper, nonwoven fabric, carbon-made fabric, finished paper, felt or the like. If the GDL has excellent electron conductivity, then efficient transportation of the electrons generated by the power generation reaction is achieved, and the performance of the fuel cell is enhanced. Moreover, if the GDL has excellent water repellency, then water generated by the power generation reaction is discharged efficiently.

In order to ensure high water repellency, a technology for performing water-repellent treatment for the material composing the GDL is also proposed. For example, the material composing the GDL, such as the carbon paper, is impregnated into a solution containing fluorine resin such as polytetrafluoroethylene (PTFE), and is dried in the atmosphere or in inert gas such as nitrogen. Depending on the case, hydrophilic treatment may be performed for the material composing the GDL.

Besides the above, carbon particles and a binder are arranged on a sheet-like GDL composed of the carbon paper, the nonwoven fabric, the carbon-made fabric, the finished paper, the felt or the like, and both thereof may be used as the gas diffusion layers. Alternatively, a film itself composed of the carbon particles and the binder may be used as the gas diffusion layer. As a result, the water-repellent material and the carbon particles are formed uniformly on the film itself, and accordingly, an increase of the water-repellent efficiency is observed in comparison with the above-described coating.

As the water-repellent material, there are mentioned fluorine resins such as polytetrafluoroethylene (PTFE), polyvinylidene fluoride (PVDF), polyhexafluoropropylene, and a tetrafluoroethylene-hexafluoropropylene copolymer (FEP), polypropylene, polyethylene, and the like. Among them, the fluorine resins are preferable since the fluorine resins are excellent in water repellency, corrosion resistance at the time of the electrode reaction, and the like. Note that the "binder" refers to a substance having the role of the adhesive.

A content of the water-repellent material contained in the electrode catalyst layer is preferably 5 mass % to 50 mass %, more preferably 10 mass % to 20 mass %, with respect to the total amount of all the materials composing the electrode catalyst layer. If the content of the water-repellent material is less than 5 mass %, then the water repellency of the electrode catalyst layer is not sufficient. If the content of the water-repellent material exceeds 50 mass %, then the strength of the electrode catalyst layer is not sufficient. Accordingly, in these cases, such a catalyst coated membrane (CCM) cannot be fabricated.

In the present invention, the membrane electrode assembly can be manufactured by a similar method to methods conventionally known in public. For example, the prepared catalyst slurry is first coated with a desired thickness on transcription sheets, followed by drying, whereby the cathode-side and anode-side electrode catalyst layers are formed. Then, these electrode catalyst layers are located so as to be opposed to each other, and the electrolyte membrane fabricated by the above-described membrane-forming method is sandwiched by the electrode catalyst layers concerned, followed by bonding by means of hot press and the like. Thereafter, the transcription sheets are peeled off. In such a way, the membrane electrode assembly is obtained. Alternatively, the catalyst slurry is directly coated on the electrolyte membrane, whereby the membrane electrode assembly may be fabricated.

In the catalyst slurry of the present invention, the electrode catalyst may be used by any amount as long as the electrode catalyst can sufficiently exert a desired function, that is, a function to catalyze the hydrogen oxidation reaction (on the anode side) and the oxygen reduction reaction (on the cathode side). The electrode catalyst is present in the catalyst slurry by an amount of preferably 0.1 mass % to 10 mass %, more preferably 1 mass % to 3 mass %.

In the catalyst slurry of the present invention, a water-repellent polymer such as the polytetrafluoroethylene, the polyhexafluoropropylene and the tetrafluoroethylene-hexafluoropropylene copolymer, and the like may be contained in addition to the electrode catalyst, the polymer electrolyte and the solvent. In such a way, the water repellency of the obtained electrode catalyst layer can be enhanced, and the water and the like, which are generated at the time of the power generation, can be discharged rapidly. An amount of the water-repellent polymer in the case of using the water-repellent polymer concerned are not particularly limited as long as the above-described effects of the present invention are not inhibited; however, are preferably 1 mass % to 10 mass % with respect to the total amount of the catalyst slurry.

In place of the water-repellent polymer or in addition to the water-repellent polymer, the catalyst slurry of the present invention may contain a thickener. Use of the thickener is effective in such a case where the catalyst slurry cannot be coated well on the transcription sheets. The thickener usable in this case is not particularly limited, and a publicly known thickener is usable. However, glycerol, ethylene glycol (EG), polyvinyl alcohol (PVA) and the like are mentioned. An amount of the thickener are not particularly limited as long as the above-described effects of the present invention are not hindered; however, are preferably 1 mass % to 10 mass % with respect to the total amount of the catalyst slurry.

A preparation method of the catalyst slurry of the present invention is not particularly limited as long as the preparation method can prepare the catalyst slurry in which the electrode catalyst, the electrolyte and the solvent, and the water-repellent polymer and the thickener according to needs, are appropriately blended together. Moreover, the solvent composing the catalyst slurry for use in the present invention is not particularly limited, and a usual solvent for use in forming the catalyst layer can be used similarly. Specifically, water and lower alcohols such as cyclohexanol, ethanol and 2-propanol can be used.

An amount of the solvent for use in the present invention is not particularly limited as long as the electrolyte can be dissolved completely; however, is an amount that allows the electrolyte to be contained in the solvent at a concentration of preferably 0.1 mass % to 20 mass %, more preferably 1 mass % to 10 mass %. If the concentration of the electrolyte exceeds 20 mass %, then there is a possibility that the electrolyte may not be dissolved completely but a part thereof may be formed into colloid. Meanwhile, if the concentration of the electrolyte is less than 0.1 mass %, the amount of the contained electrolyte is too small, and there is a possibility that molecular chains of the electrolyte polymer may not be entangled sufficiently, resulting in a deterioration of the mechanical strength of the formed electrode catalyst layer. Moreover, in the slurry, a concentration of a total solid content of the electrode catalyst, the polymer electrolyte and the like is recommended to be set at preferably 0.1 mass % to 20 mass %, more preferably 5 mass % to 10 mass %.

The catalyst slurry of the present invention may be used for either one of the cathode catalyst layer and the anode catalyst layer or for both thereof. However, in particular, the cathode side has a high risk that a supply amount of the reaction gas to the electrode catalyst layer may be decreased owing to the following factor. Specifically, the cathode side is affected by a humidity change resulting from an amount change of the generated water, which is caused by output variations. Then, a porous structure of the electrode catalyst layer in an initial state is broken, and as a result, the porosity thereof is decreased. From the above, it is preferable that the catalyst slurry of the present invention be used at least for the cathode catalyst layer, and it is particularly preferable that the catalyst slurry be used for both of the cathode catalyst layer and the anode catalyst layer.

Moreover, a moisture content of each of the electrode catalyst layers for use in the membrane electrode assembly according to the present invention is preferably 1% to 30%, more preferably 10% to 20%. If the moisture content is less than 1%, then sufficient water required for the operation of the fuel cell cannot be held. If the moisture content is 30% or more, then, the swelling ratio is increased, and the contained water closes a course of the reaction gas. Then, there is a possibility that a sufficient amount of the gas for the power generation cannot reach the catalyst surface.

A thickness of the membrane electrode assembly according to the present invention is recommended to be set at preferably 100 micrometer to 1000 micrometer, more preferably 200 micrometer to 700 micrometer.

The membrane electrode assembly according to the present invention can be used for the fuel cell. In accordance with such a mode, it is possible to provide a fuel cell excellent in durability.

The type of the fuel cell is not particularly limited. Although the above description has been made by taking as an example the polymer electrolyte fuel cell, an alkaline fuel cell, a direct methanol fuel cell, a micro fuel cell, a fuel cell with an acidic electrolyte, which is represented by a phosphoric acid fuel cell, and the like are mentioned besides the polymer electrolyte fuel cell. Among them, the polymer electrolyte fuel cell is preferably mentioned since it is compact and possible to enhance a density and output thereof. Moreover, the fuel cell is useful as a stationary power supply as well as a power supply for a mobile body such as a vehicle in which a space for mounting the fuel cell is limited. In particular, the fuel cell can be suitably used for an automobile in which there frequently occur activation and stop of the system, and the output variations.

The polymer electrolyte fuel cell is useful as the power supply for the mobile body such as the automobile in which the space for mounting the fuel cell concerned is limited, as well as the stationary power supply. In particular, it is preferable to use the polymer electrolyte fuel cell as the power supply for the mobile body such as the automobile, in which corrosion of the carbon support is prone to be caused by the fact that a high output voltage is required after the operation is stopped for a relatively long time, and a deterioration of the polymer electrolyte is prone to be caused by the fact that a high output voltage is extracted at the time of the operation.

A configuration of the fuel cell is not particularly limited, and technologies conventionally known in public just needs to be appropriately utilized therefor. However, as shown in FIG. 1 in general, the fuel cell has a structure in which the membrane electrode assembly 10 is sandwiched by the separators 15.

As the separators 15, separators conventionally known in public, such as separators made of carbons including dense carbon graphite and a carbon plate, and of metals including stainless steel, can be used without any limitations. Each of the separators has a function to separate the air and the fuel gas from each other. A flow passage groove for ensuring a flow passage of the air and the fuel gas may be formed in the separator. A thickness and size of the separator, a shape of the flow passage groove, and the like are not particularly limited, and just need to be decided as appropriate in consideration for the output characteristics and the like of the obtained fuel cell.

Moreover, as shown in FIG. 1, gas seals 16 may be provided in order to prevent external leakage of the gases supplied to the respective catalyst layers. As materials composing the gas seals, there are mentioned rubber materials such as fluorine rubber, silicon rubber, ethylene propylene rubber (EPDM) and polyisobutylene rubber, fluorine polymer materials such as polytetrafluoroethylene (PTFE), polyvinylidene fluoride (PVDF), polyhexafluoropropylene and a tetrafluoroethylene-hexafluoropropylene copolymer (FEP), thermoplastic resins such as polyolefin and polyester, and the like. Moreover, a thickness of the gas seals is recommended to be set at 50 micrometer to 2 mm, desirably 100 micrometer to 1 mm.

Furthermore, in order that the fuel cell can obtain desired voltage and the like, a stack may be formed, in which a plurality of the membrane electrode assemblies are stacked on one another while interposing the separators therebetween, and are connected to one another in series. A shape of the fuel cell is not particularly limited, and just needs to be decided as appropriate so that the fuel cell can obtain cell characteristics such as the desired voltage and the like.

A description will be made below in detail of the embodiment of the present invention by examples and comparative examples. The present invention is not limited to these examples.

EXAMPLE 1

Examples where a Content of Titania Filler Differs

Needle-like titania powder (FTL-100, made by Ishihara Sangyo Kaisha, Ltd.) with an aspect ratio of 12.9 and N-methylpyrrolidone (NMP) were mixed together at amounts shown in the following Table 1, and obtained mixtures were stirred by using an ultrasonic washer. Subsequently, into the mixtures, powder of sulfonated polyether sulfone (S-PES) (ion exchange capacity: 1.8 meq/g) was poured at amounts shown in Table 1, followed by mixing. Then, obtained mixtures were stirred for four hours, and gradually cooled down to room temperature. In such a way, titania filler-dispersed solutions were obtained. The obtained titania filler-dispersed solutions were spread by using a stainless steel-made applicator. A gap of the applicator was set at 0.32 mm, a sweeping speed (also referred to as a "membrane-forming speed") thereof on a glass plate was set at approximately 7.2 cm/min, and the titania filler-dispersed solutions were coated on the glass plates. Thereafter, membranes thus obtained were subjected to heat treatment at 80 degrees Celsius for 10 hours. The membranes after being subjected to the heat treatment were immersed together with the glass plates into pure water for three minutes, and the membranes were peeled from the glass plates. Thereafter, the membranes thus peeled were impregnated into 1N HCl of the room temperature for 10 hours, and subsequently, were immersed into the pure water again for 10 hours, whereby HCl was removed therefrom. The obtained membranes were dried at the room temperature for 10 hours, and electrolyte membranes of Examples 1-a to 1-d were obtained.

COMPARATIVE EXAMPLE 1

As a comparative example in the case where the electrolyte is S-PES, an S-PES membrane having no filler was created. Specifically, 15.3 g of NMP and 2.7 g of sulfonated polyether sulfone (S-PES) powder were mixed together, and an obtained mixture was stirred at 80 degrees Celsius for four hours, and was gradually cooled down to the room temperature. The membrane-forming, the heat treatment and the washing, which followed, were carried out by similar methods to those in Example 1.

TABLE 1

Amounts of S-PES, TiO$_2$ and NMP in Example 1 and Comparative example 1

|  | TiO$_2$ filler (wt %) | S-PES (g) | TiO$_2$ (g) | NMP (mL) |
|---|---|---|---|---|
| Comparative example 1 | 0.0 | 2.7 | 0.00 | 14.9 |
| Example 1-a | 5.0 | 2.57 | 0.14 | 14.1 |
| Example 1-b | 10.0 | 2.43 | 0.27 | 13.4 |
| Example 1-c | 20.0 | 2.16 | 0.54 | 11.9 |
| Example 1-d | 30.0 | 1.89 | 0.81 | 10.4 |

EXAMPLE 2

Whether or not Silica-alumina Filler is Subjected to Acidic Surface Treatment

Electrolyte membranes were created by individually using silica-alumina filler that was subjected to the surface treatment by the acid and silica-alumina filler that was not subjected to the surface treatment by the acid.

Specifically, in the case of performing the surface treatment by the acid, N-methylpyrrolidone (NMP) and powder of sulfonated polyether sulfone (S-PES) (ion exchange capacity: 1.8 meq/g) were mixed together at amounts shown in Table 2. Then, an obtained mixture (S-PES solution) was stirred at 80 degrees Celsius for four hours, and gradually cooled down to the room temperature. Subsequently, into the above-described S-PES solution, p-Toluenesulfonic acid Monohydrate (PTS, made by Nacalai Tesque, Inc., 99%, GR,) and silica-alumina filler (made by Nitivy Company Limited; model number: S-6400; cut into length of approximately 0.9 mm; aspect ratio: 143) were poured at amounts shown in Table 2, followed by mixing. Then, an obtained mixture was stirred for four hours, was further stirred by the ultrasonic washer for 15 minutes, and was gradually cooled down to the room temperature. Thereafter, similar methods to those of Example 1 described above were used, whereby electrolyte membranes of Examples 2-a and 2-b were obtained.

Meanwhile, in the case of performing no surface treatment by the acid, N-methylpyrrolidone (NMP) and powder of sulfonated polyether sulfone (S-PES) (ion exchange capacity: 1.8 meq/g) were mixed together at amounts shown in Table 2. Then, obtained mixtures (S-PES solution) were stirred at 80 degrees Celsius for four hours, and gradually cooled down to the room temperature. Subsequently, into the S-PES solutions, silica-alumina filler (made by Nitivy Company Limited; model number: S-6400; cut into diameter of 7 micrometer and length of approximately 0.9 mm; aspect ratio: 143) were poured at amounts shown in Table 2, followed by mixing. Then, obtained mixtures were stirred for four hours, and were gradually cooled down to the room temperature. Thereafter, similar methods to those of Example 1 described above were used, whereby electrolyte membranes of Examples 2-c and 2-d were obtained.

TABLE 2

Amounts of S-PES, silica-alumina and NMP in Example 2

|  | Silica-alumina filler (wt %) | S-PES (g) | Silica-alumina filler (g) | p-Toluenesulfonic acid Monohydrate (g) | NMP (mL) |
|---|---|---|---|---|---|
| Example 2-a | 5.0 | 3.8 | 0.2 | 0.5 | 35.1 |
| Example 2-b | 10.0 | 3.6 | 0.4 | 1.0 | 35.1 |
| Example 2-c | 5.0 | 3.8 | 0.2 | — | 35.1 |
| Example 2-d | 10.0 | 3.6 | 0.4 | — | 35.1 |

Evaluation of Manufactured Electrolyte Membrane
Observing Evaluation

Figure 6:
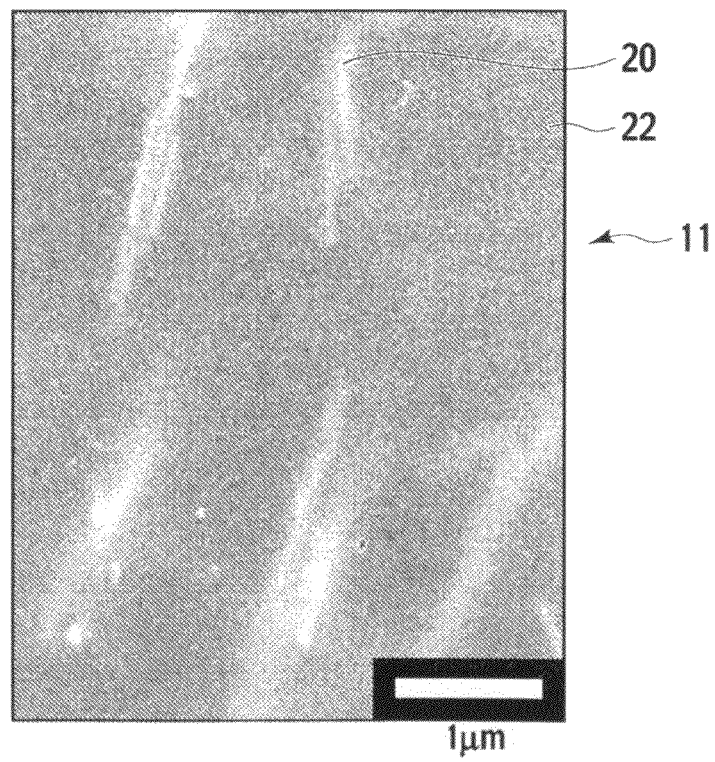
FIG. 6 is an SEM picture showing a result of observing a surface of an electrolyte membrane containing 10 wt % of $TiO_2$, which was prepared in Example 1-b.
Figure 12:
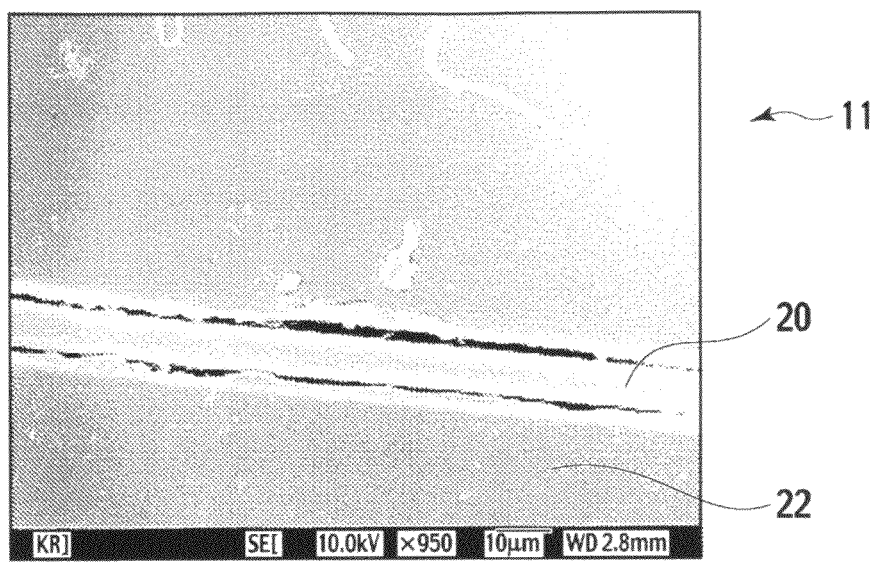
FIG. 12 is an SEM picture showing a result of observing a surface of an electrolyte membrane using silica-alumina filler that was prepared in Example 2 and was not subjected to acidic surface treatment.
Figure 13:
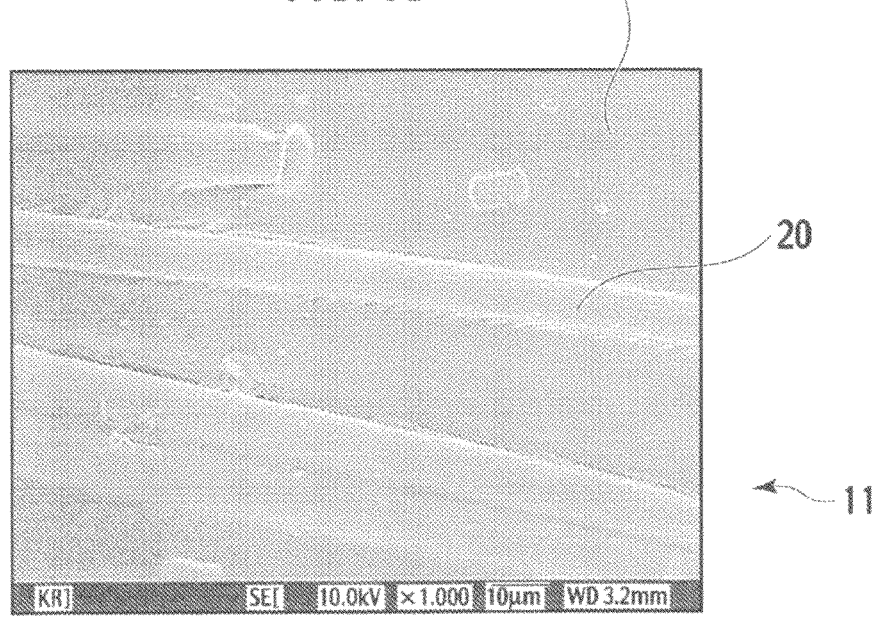
FIG. 13 is an SEM picture showing a result of observing a surface of an electrolyte membrane using silica-alumina filler that was prepared in Example 2 and was subjected to the acidic surface treatment.

Observation was performed for a surface of the electrolyte membrane containing 10 wt % of TiO$_2$, which was prepared in Example 1-b, a surface of the electrolyte membrane using the silica-alumina filler subjected to no acidic surface treatment, which was prepared in Example 2, and a surface of the electrolyte membrane using the silica-alumina filler subjected to the acidic surface treatment. The observation was performed under conditions where an acceleration voltage was 10 kV and a working distance was approximately 3 mm. Moreover, the observation was performed by using an FE-SEM (field emission-scanning electron microscope, JSM-6700F, made by Jeol Datum Ltd.) after fixing each of the electrolyte membranes to an SEM sample holder by using a carbon tape and then implementing conduction treatment for each surface by Pt evaporation. Note that, in the Pt evaporation, a Pt film was formed to a thickness of approximately 10 nm, an evaporation current was set at 20 mA, and an evaporation time was set at 60 seconds. FIG. 6 is an SEM picture of the surface of the electrolyte membrane of Example 1-b. FIG. 12 is an SEM picture of the surface of the electrolyte membrane using the silica-alumina filler subjected to no acidic surface treatment. FIG. 13 is an SEM picture of the surface of the electrolyte membrane using the silica-alumina filler subjected to the acidic surface treatment. Note that, in the drawings, reference numeral 22 denotes the polymer electrolyte.

Figure 15:
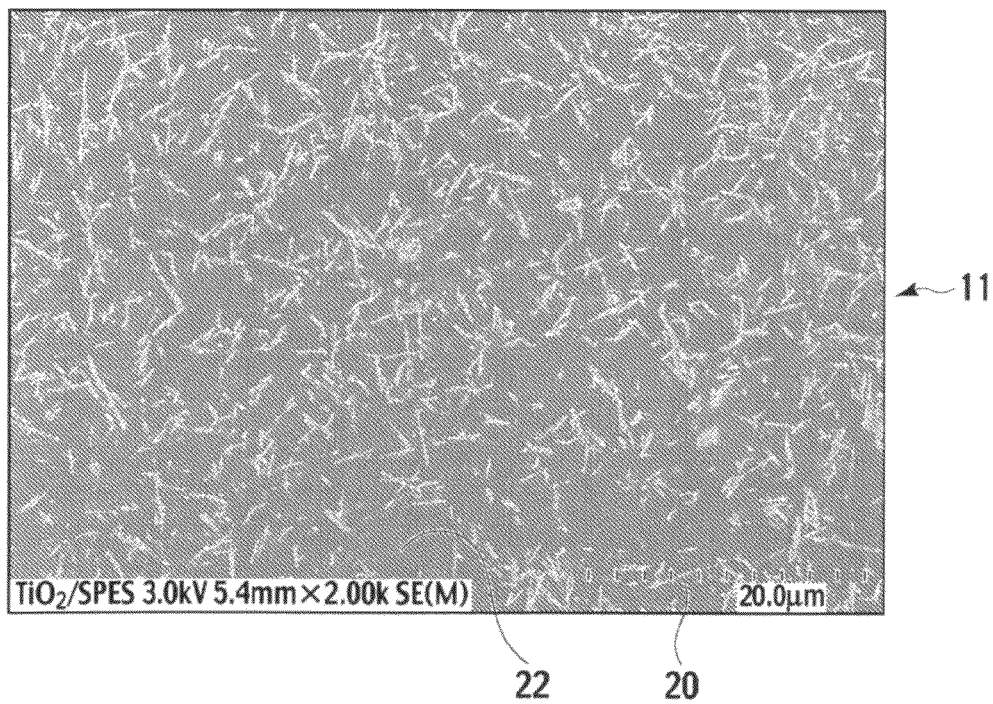
FIG. 15 is an SEM picture showing a result of observing a cross section in a membrane surface direction xy of an electrolyte membrane containing 30 wt % of $TiO_2$, which was prepared in Example 1.
Figure 16:
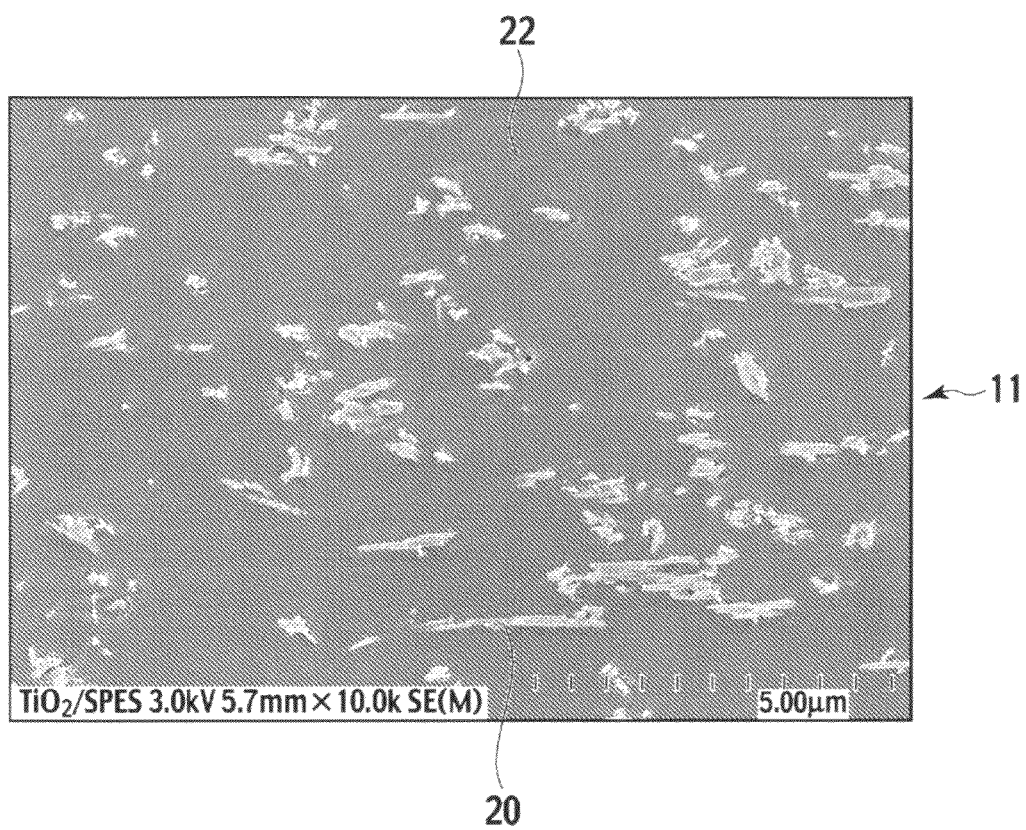
FIG. 16 is an SEM picture showing a result of observing a cross section in a membrane thickness direction z of the electrolyte membrane containing 30 wt % of $TiO_2$, which was prepared in Example 1.

Moreover, for the electrolyte membrane containing 30 wt % of $TiO_2$, which was prepared in Example 1-d, a cross section along a direction parallel to the membrane surface and a cross section along a direction perpendicular thereto were observed. FIG. 15 shows an observation picture of the cross section along the direction xy parallel to the membrane surface, and FIG. 16 shows an observation picture of the cross section along the direction z perpendicular to the membrane surface. For the observation, first, observed cross sections of the electrolyte membrane were fabricated by microtome cutting under conditions where an acceleration voltage was 3 kV and a working distance was approximately 5 mm, and the cross sections were cut to an appropriate size. Subsequently, after fixing the electrolyte membrane to the SEM sample holder by using the carbon tape and then lightly etching the electrolyte membrane concerned by Argon ion, the conduction treatment was performed for the surface by the Pt evaporation in a similar way to the above, and the observation was performed by using an FE-SEM (field emission-scanning electron microscope S-4700, made by Hitachi, Ltd.).

Figure 7:
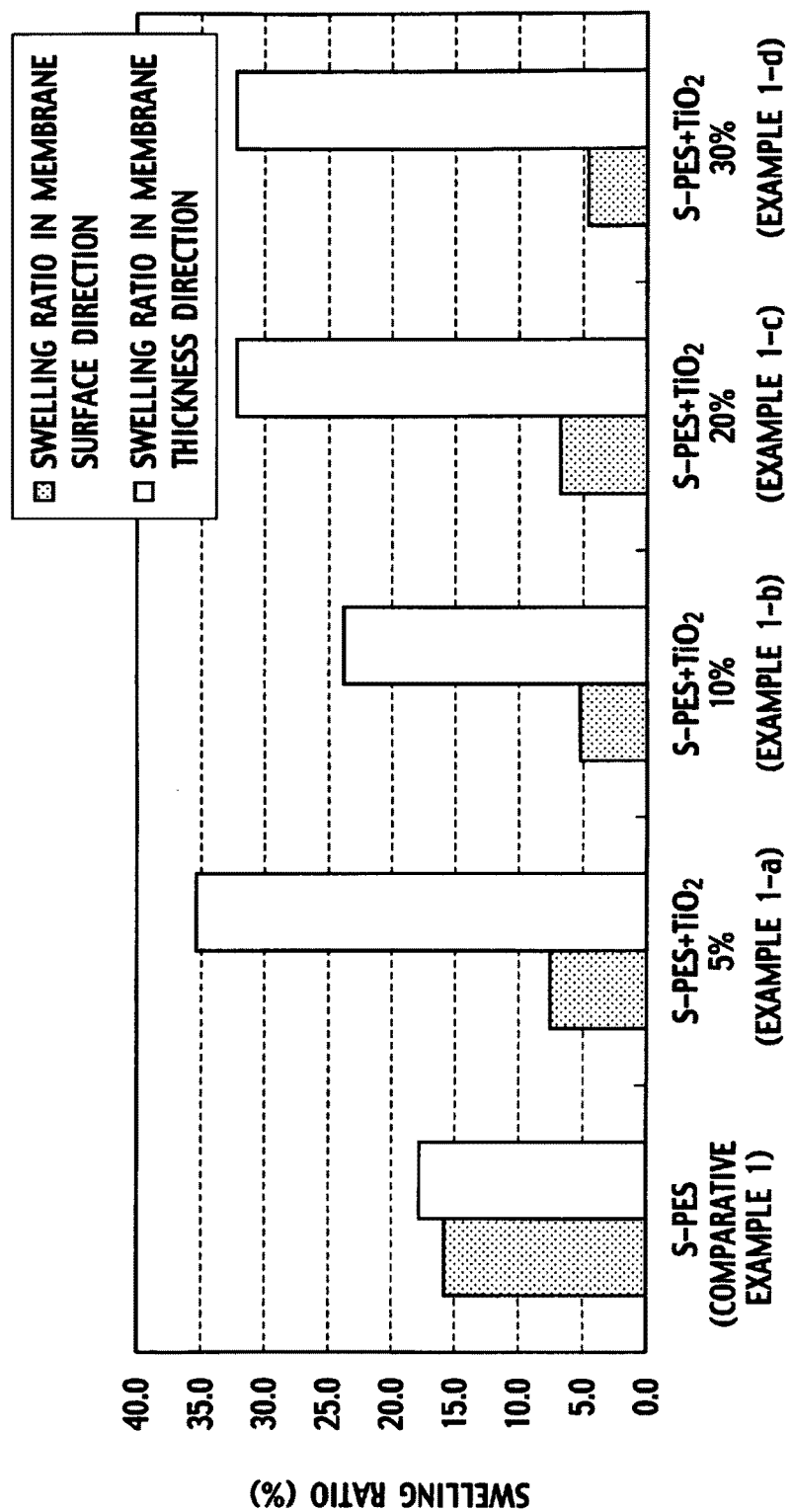
FIG. 7 is a graph showing results of measuring swelling ratios of electrolyte membranes prepared in Example 1 and Comparative example 1.

Measurement of Swelling Ratio (FIG. 7)

By the following method, swelling ratios of the electrolyte membranes prepared in Example 1 and Comparative example 1 were measured.

Specifically, each of the electrolyte membranes was cut to a size of 40 mm (longitudinal) by 10 mm (width), and was left in an atmosphere where a temperature was 23 degrees Celsius and a humidity was 50% RH for 24 hours. Thereafter, a membrane thickness of each electrolyte membrane thus cut out was measured by a thickness meter (TH-104 made by Tester Sangyo Co., Ltd.), and a longitudinal dimension thereof was measured by a ruler. Thereafter, the electrolyte membrane was immersed into pure water at 23 degrees Celsius for 24 hours, and the water on the surface of the electrolyte membrane was wiped out by filter paper, the membrane thickness of the immersed electrolyte membrane was measured by the thickness meter (TH-104 made by Tester Sangyo Co., Ltd.), and the longitudinal dimension thereof was measured by the ruler. From values thus obtained, a swelling ratio in the membrane thickness direction and a swelling ratio in the membrane surface direction were calculated individually by the following Expression 12 (Math 12) for each of the processed electrolyte membranes. A graph showing calculation results is shown in FIG. 7. Note that, in the present invention, the swelling ratio in the membrane surface direction xy is substantially the same between the x-axis direction as a long-side direction of the electrolyte membrane and the y-axis direction as a short-side direction thereof, and accordingly, the swelling ratio in the membrane surface direction at this time was calculated based on the dimension in the long-side direction (longitudinal direction).

Swelling ratio $\lambda xy$ in membrane thickness direction= (membrane thickness after immersion−membrane thickness before immersion)/(membrane thickness before immersion)×100

Swelling ratio $\lambda z$ in membrane surface direction=(longitudinal dimension after immersion−longitudinal dimension before immersion)/(longitudinal dimension before immersion)×100 [Math. 12]

Moreover, from values of the swelling ratios shown in FIG. 7, moisture contents of the electrolyte membranes were calculated by the following Expression 13 (Math 13). Calculation results are shown in the following Table 3 and Table 4. Note that, in calculating the moisture contents, volume increments of the electrolyte membranes were regarded equivalent to the moisture contents.

$$\text{Moisture content} = \frac{[((la)^2 \times (ta)) - ((lb)^2 \times (tb))]}{[(lb)^2 \times (tb)]}$$

$$= \frac{[(\text{volume after immersion}) - (\text{volume before immersion})]}{(\text{volume before immersion})}$$

Figure 8:
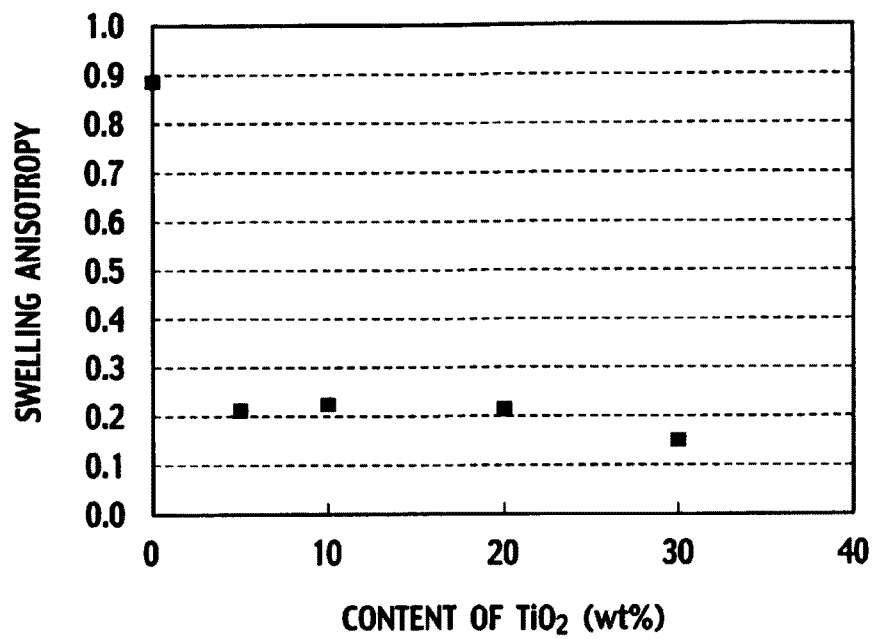
FIG. 8 is a graph showing results of measuring swelling anisotropies of the electrolyte membranes prepared in Example 1 and Comparative example 1.

[Math. 13]

where:
(la): longitudinal dimension after immersion
(ta): membrane thickness after immersion
(lb): longitudinal dimension before immersion
(tb): membrane thickness before immersion Calculation of Swelling Anisotropy (FIG. 8)

Moreover, from the values of the swelling ratios shown in FIG. 7, swelling anisotropies of the electrolyte membranes were calculated by the following Expression 14 (Math 14). Calculation results are shown in FIG. 8 and the following Table 3.

$$\text{Swelling anisotropy} = \frac{\lambda xy}{\lambda z}$$ [Math. 14]

where Lambda z is the swelling ratio in the membrane thickness direction, and Lambda xy is the swelling ratio in the membrane surface direction.

TABLE 3

Membrane thicknesses, moisture contents and swelling anisotropies of electrolyte membranes obtained in Example 1 and Comparative example 1

| | $TiO_2$ filler (wt %) | Membrane thickness of electrolyte membrane (μm) | Moisture content of electrolyte membrane (mass %) | Swelling anisotropy ($\lambda xy/\lambda z$) |
|---|---|---|---|---|
| Comparative example 1 | 0.0 | 40 | 36.4 | 0.89 |
| Example 1-a | 5.0 | 44 | 35.8 | 0.21 |
| Example 1-b | 10.0 | 43 | 34.9 | 0.22 |
| Example 1-c | 20.0 | 41 | 33.6 | 0.21 |
| Example 1-d | 30.0 | 44 | 31.0 | 0.15 |

TABLE 4

Membrane thicknesses and moisture contents of electrolyte membranes obtained in Example 2

| | Silica-alumina filler (wt %) | Membrane thickness of electrolyte membrane (filler subjected to acidic surface treatment) (μm) | Membrane thickness of electrolyte membrane (filler subjected to no acidic surface treatment) (μm) | Moisture content of electrolyte membrane (mass %) |
|---|---|---|---|---|
| Example 2-a | 5.0 | 38 | — | 35.0 |
| Example 2-b | 10.0 | 45 | — | 34.6 |

TABLE 4-continued

Membrane thicknesses and moisture contents of electrolyte membranes obtained in Example 2

| | Silica-alumina filler (wt %) | Membrane thickness of electrolyte membrane (filler subjected to acidic surface treatment) (μm) | Membrane thickness of electrolyte membrane (filler subjected to no acidic surface treatment) (μm) | Moisture content of electrolyte membrane (mass %) |
|---|---|---|---|---|
| Example 2-c | 5.0 | — | 35 | 35.0 |
| Example 2-d | 10.0 | — | 78*[)] | 34.6 |

*[)]Irregularities occurred on the surface of the membrane owing to the aggregation of the silica-alumina.

Figure 9:
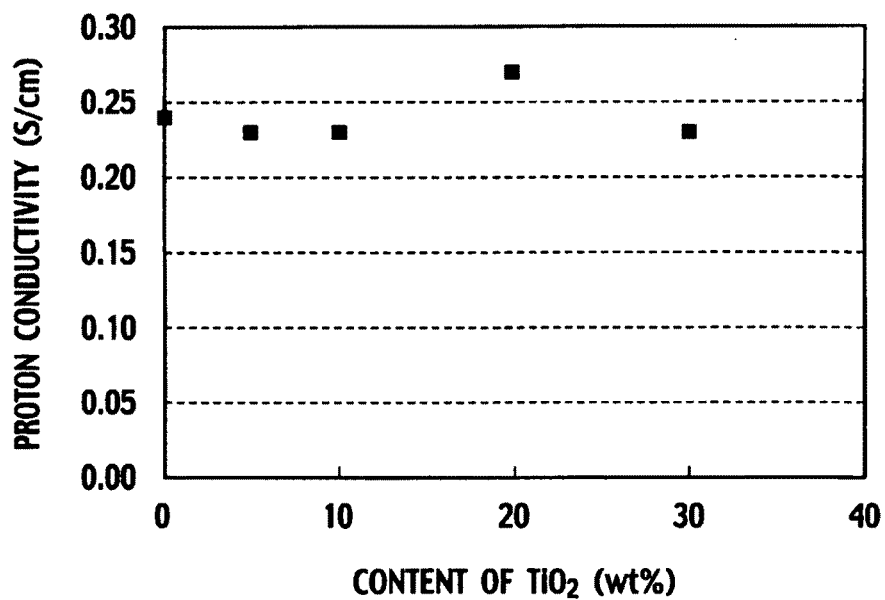
FIG. 9 is a graph showing results of measuring proton conductivities of the electrolyte membranes prepared in Example 1 and Comparative example 1.

Proton Conductivity (FIG. 9)

By the following method, proton conductivities of the electrolyte membranes prepared in Example 1 and Comparative example 1 were measured. Specifically, first, the electrolyte membranes (size: 30 mm by 15 mm) prepared in Example 1 and Comparative example 1 were set in a thermo-hygrostat, in which a temperature was set at 80 degrees Celsius, and a humidity was set at 95% RH. Then, a platinum wire was placed on the electrolyte membranes so that an inter-electrode distance could be 10 mm. Subsequently, membrane resistances of the electrolyte membranes were measured by an alternating current impedance method, whereby proton conductivities thereof were calculated. Calculation results are shown in FIG. 9. Alternative current impedances were measured by using the impedance analyzer SI1260 made by Solartron under conditions where a frequency was set at 10 Hz to 1 MHz and an applied voltage was set at 0.2V.

Figure 11:
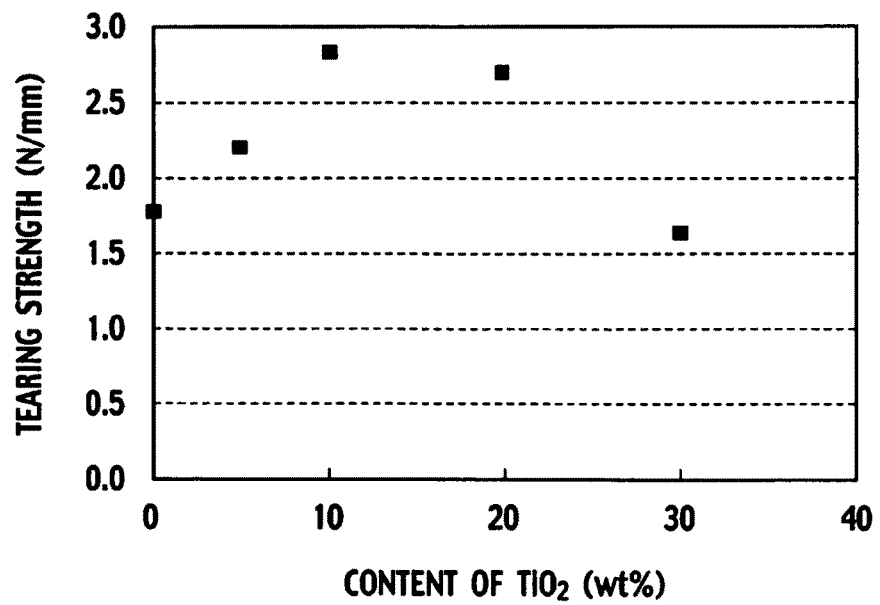
FIG. 11 is a graph showing results of performing a tearing strength test for the electrolyte membranes prepared in Example 1 and Comparative example 1.
Figure 14:
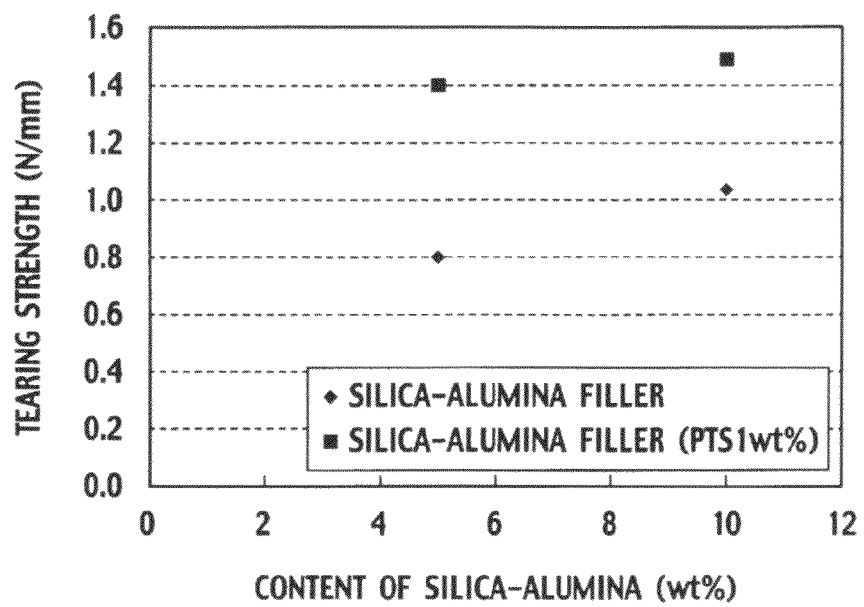
FIG. 14 is a graph showing results of performing the tearing strength test for the electrolyte membrane prepared in Example 2.

Tearing Strength (FIG. 11, FIG. 14)

Based on ASTM D 1938, a tearing strength test (temperature: 23 degrees Celsius; humidity: 50% RH) was performed for the electrolyte membranes prepared in Example 1, Example 2 and Comparative example 1. Results in Example 1 and Comparative example 1 are shown in FIG. 11, and results in Example 2 are shown in FIG. 14.

Fabrication of MEA for Fuel Cell and Evaluation Thereof

By the following method, MEAs for a fuel cell were fabricated by using the respective electrolyte membranes prepared in Example 1 and Comparative example 1.

Fabrication of Electrode Catalyst Layer

Purified water of which weight was five times a weight of Pt-supported carbon fiber (TEC10E50E, made by Tanaka Kikinzoku Kogyo K.K.) was added thereto, and to a mixture thus obtained, isopropyl alcohol of which weight was 0.5 time the Pt-supported carbon fiber was added. Moreover, a Nafion solution (containing 5 wt % of Nafion, made by Aldrich) was added so that a weight of Nafion could be 0.8 time the Pt-supported carbon fiber. Dispersion treatment was performed sufficiently for obtained mixed slurry by means of an ultrasonic homogenizer, followed by decompression and defoaming, whereby catalyst ink was created. A predetermined amount of the catalyst ink was printed on one surface of carbon paper (TGP-H-060, made by Toray Industries, Inc.) by a screen printing method, and was dried at 60 degrees Celsius for 24 hours, whereby an electrode catalyst layer was fabricated.

The electrolyte membrane was sandwiched by two electrode catalyst layers formed on such carbon papers so that surfaces of the electrode catalyst layers could face to the electrolyte membrane, and was subjected to hot press for 10 minutes under conditions where a temperature was 120 degrees Celsius and a pressure was 1.2 MPa. In such a way, an MEA for the fuel cell was fabricated.

Figure 10:
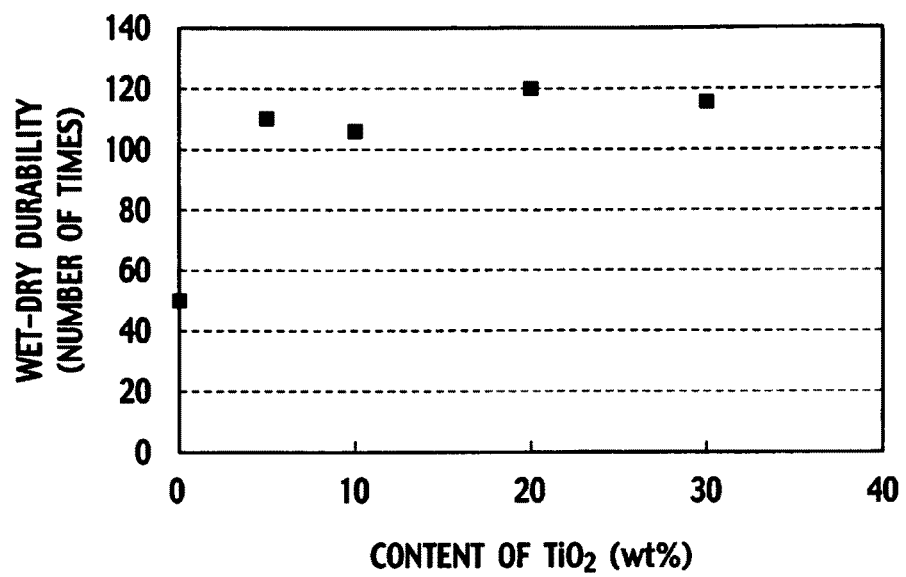
FIG. 10 is a graph showing results of evaluating wet-dry cycle durabilities of MEAs for fuel cells, which were fabricated by using the electrolyte membranes prepared in Example 1 and Comparative example 1.

Wet-Dry Durability (FIG. 10)

By the following method, wet-dry cycle durability of the MEA for the fuel cell, which was fabricated as described above, was evaluated. Specifically, first, power generation at 1 A/cm$^2$ was performed for three minutes (70 degrees Celsius; anode humidity: 100% RH; cathode humidity: 100% RH). Thereafter, for both of the anode and the cathode, a purging operation was performed for one minute by using dry nitrogen gas. At this time, a temperature of the dry nitrogen gas was 70 degrees Celsius, and a flow rate thereof was 1 L/min. Then, the number of cycles until a crack occurred in the electrolyte membrane and the gas leaked was recorded. Results are shown in FIG. 10.

From the result shown in FIG. 6, it is understood that, in accordance with the present invention, it is possible to obtain an electrolyte membrane in which the filler is oriented in the membrane surface direction. Moreover, from FIG. 8, it is understood that, in the electrolyte membranes obtained in Example 1, the swelling anisotropies fall below 0.3. Furthermore, the following is understood from Table 3. If the content ratio of TiO$_2$ is up to approximately 20 wt % even if the filler is contained, then the decrease of the moisture content hardly occurs. Moreover, even if the content ratio of TiO$_2$ is approximately 30%, the decrease of the moisture content is no more than approximately 20%. Accordingly, it is considered that the performance of the fuel cell is not impaired, either, if the content ratio of TiO$_2$ is up to approximately 20%.

From FIG. 9, it is understood that the proton conductivity of the electrolyte membrane provided by the present invention is hardly decreased in comparison with that in Comparative example 1. Hence, it is understood that, even if the ratio of the electrolyte per unit volume is reduced as a result of blending the filler, an influence on the proton conductivity is hardly caused thereby, and it is not necessary to consider the decrease of the performance owing to the filler.

From FIG. 11, it is understood that the filling of TiO$_2$ enhances the tearing strength. The tearing strength has the maximum within a range where the filling rate of TiO$_2$ is 2.5 wt % to 25 wt %. Since a density of TiO$_2$ is 4 g/cm$^3$, and a density of the sulfonated polyether sulfone is 1.2 g/cm$^3$, with regard to a volume ratio of TiO$_2$ in this case, the tearing strength has the maximum within a range where the volume ratio is 0.76 vol % to 9.1 vol %. This is considered to be because, if the filling rate is too high, then resistance to the tearing is decreased owing to the aggregation of the filler, creation of voids in micro gaps among pieces of the filler, and the like. It is considered that, as well as the swelling anisotropy, the tearing strength affects the wet-dry cycle of the fuel cell. The crack of the electrolyte membrane in the fuel cell occurs in a micro region, and it is considered that the occurrence of the crack is similar to a destruction behavior of the electrolyte membrane in the micro region as in the tearing test (ASTM D 1938).

Not only from the SEM pictures shown in FIG. 12 and FIG. 13 but also from FIG. 14, it can be confirmed that the dispersibility of the filler is enhanced when the surface of the filler is treated by using the PTS, from a viewpoint of the enhancement of the tearing strength.

From FIG. 10, it is understood that the dry-wet cycle durability of the electrolyte membrane provided by the present invention in the fuel cell is enhanced to approximately double that in Comparative example 1. Simple comparison among the durabilities of the electrolyte membranes in the fuel cells is difficult owing to variations of the operation conditions, stacking methods, gas flow passages and gas diffusion layers of the fuel cells, variations of the catalyst layers, and the like. However, it is understood that the durability of the electrolyte membrane is enhanced to a large extent when the swelling anisotropy falls below 0.3.

EXAMPLE 3

Example where the Aspect Ratio of the Filler Differs

The aspect ratio of the filler added to the electrolyte was changed, and electrolyte membranes were fabricated by a similar method to that in the case where the amount of the filler were 10 wt % in Example 1. Values of the aspect ratios of the filler used in this example and amounts of the respective materials used therein are shown in the following Table 5. Note that model numbers in Table 5 denote model numbers of titanias made by Ishihara Sangyo Kaisha, Ltd.

TABLE 5

Aspect ratios of $TiO_2$ and amounts of respective materials in Example 3

| | Aspect ratio of $TiO_2$ filler (model number) | Amount of $TiO_2$ filler (wt %) | Amount of S-PES (g) | Amount of $TiO_2$ (g) | Amount of NMP (mL) |
|---|---|---|---|---|---|
| Example 3-a | 12.9 (FTL-100) | 10.0 | 2.43 | 0.27 | 13.4 |
| Example 3-b | 13.6 (FTL-200) | 10.0 | 2.43 | 0.27 | 13.4 |
| Example 3-c | 19.1 (FTL-300) | 10.0 | 2.43 | 0.27 | 13.4 |
| Example 3-d | 22.2 (FTL-400) | 10.0 | 2.43 | 0.27 | 13.4 |

The values of the aspect ratios of FTL-100 to 300 are catalog values, and the value of the aspect ratio of FTL-400 is a measurement value by the SEM.

Figure 17:
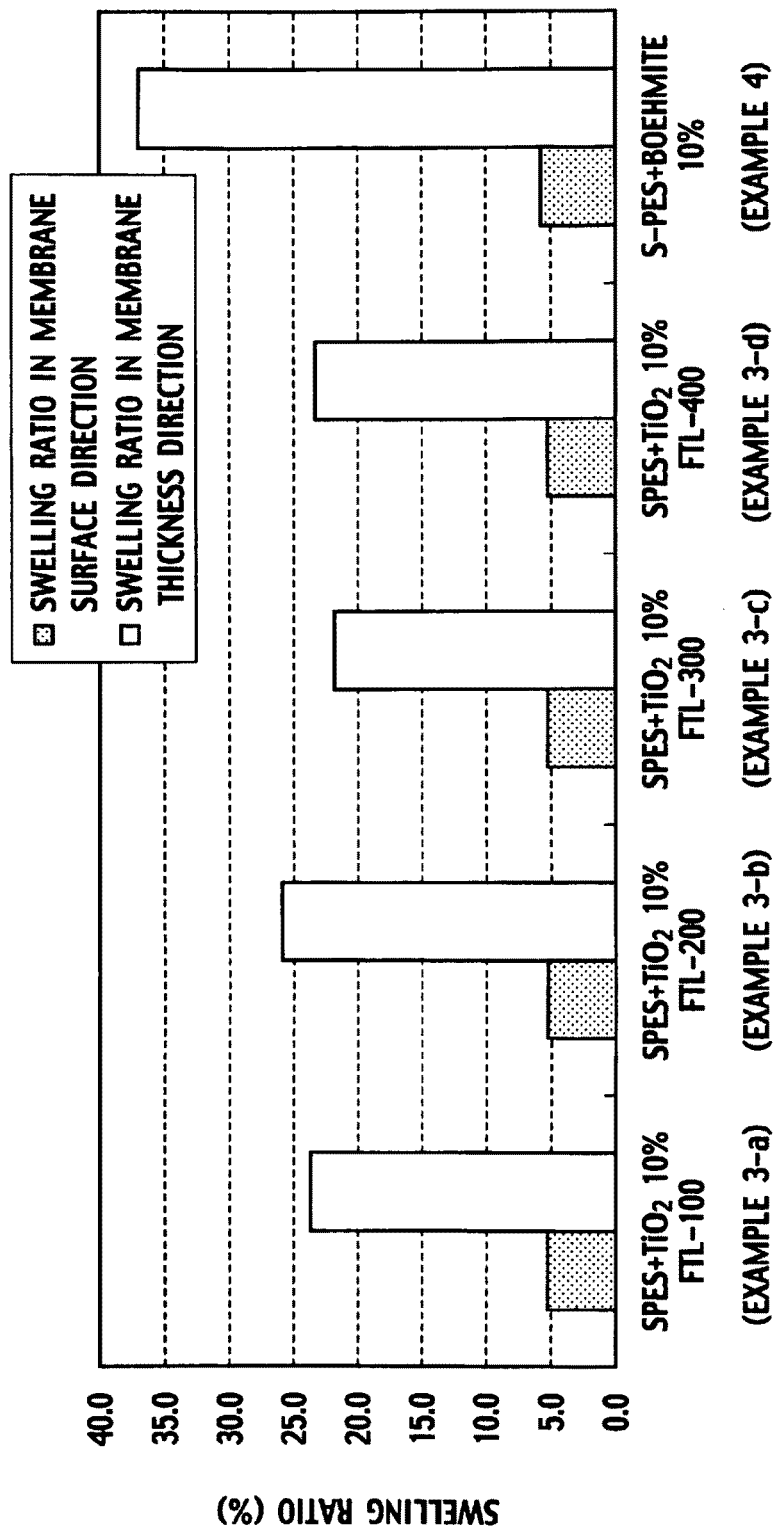
FIG. 17 is a graph showing results of measuring swelling ratios of electrolyte membranes prepared in Examples 3 and 4.
Figure 18:
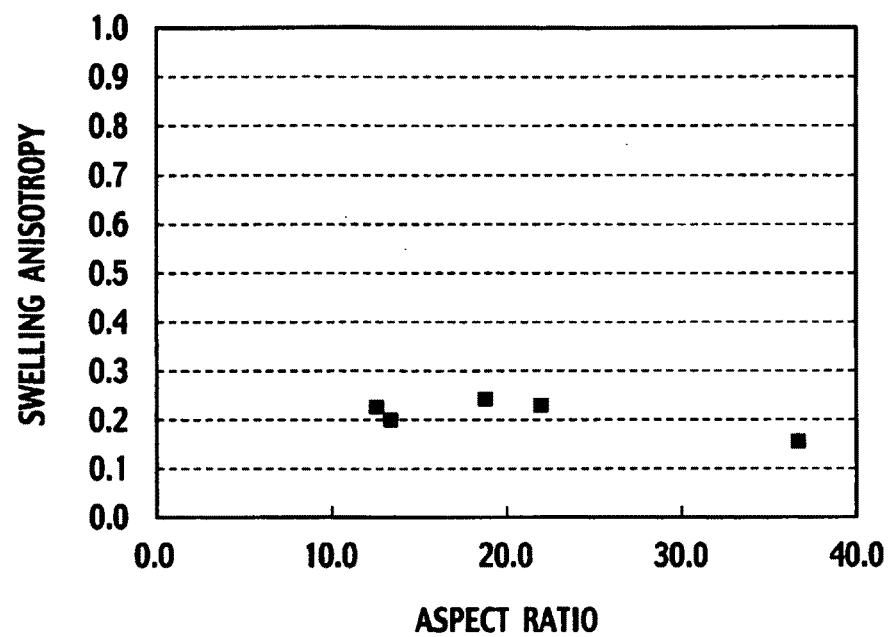
FIG. 18 is a graph showing results of measuring swelling anisotropies of the electrolyte membranes prepared in Examples 3 and 4.
Figure 19:
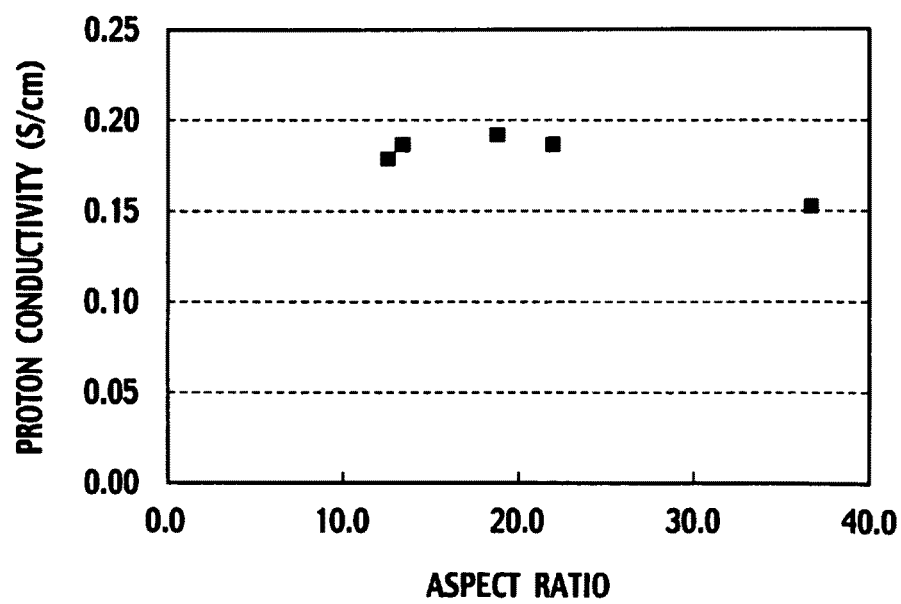
FIG. 19 is a graph showing results of measuring proton conductivities of the electrolyte membranes prepared in Examples 3 and 4.
Figure 20:
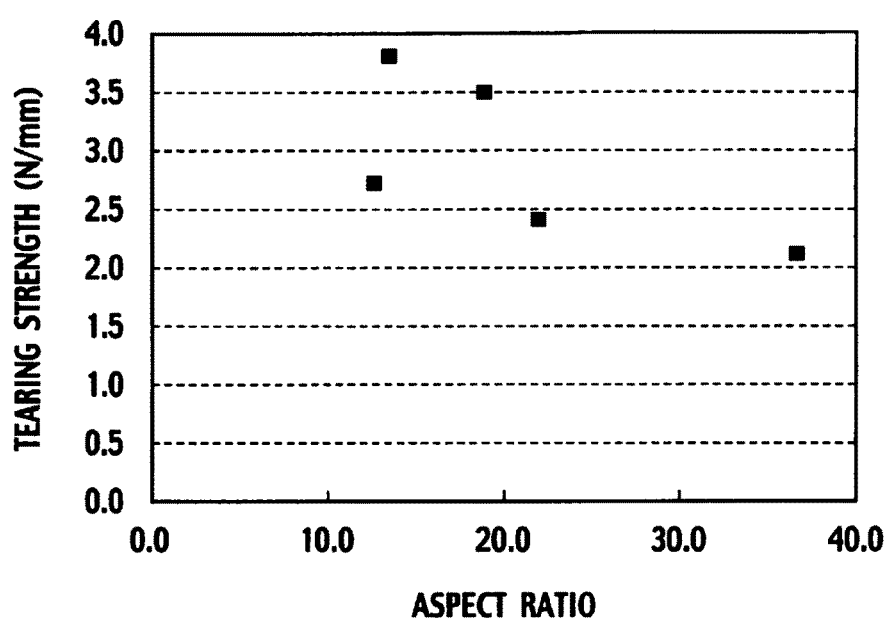
FIG. 20 is a graph showing results of performing the tearing strength test for the electrolyte membranes prepared in Examples 3 and 4.

In a similar way to the above, for the respective electrolyte membranes obtained in Example 3, membrane thicknesses, swelling ratios, swelling anisotropies, proton conductivities and tearing strengths were measured. Results of the measurement are shown in the following Table 6. In a similar way, measurement results of the swelling ratios are shown in FIG. 17, calculation results of the swelling anisotropies are shown in FIG. 18, measurement results of the proton conductivities are shown in FIG. 19, and measurement results of the tearing strengths are shown in FIG. 20.

TABLE 6

Membrane thicknesses, swelling anisotropies, proton conductivities and tearing strengths of electrolyte membranes obtained in Example 3

| | Aspect ratio of $TiO_2$ filler (model number) | Thickness of electrolyte membrane (μm) | Swelling anisotropy (λxy/λz) | Proton conductivity (S/cm) | Tearing strength (N/mm) |
|---|---|---|---|---|---|
| Example 3-a | 12.9 (FTL-100) | 44 | 0.22 | 0.18 | 2.7 |
| Example 3-b | 13.6 (FTL-200) | 50 | 0.20 | 0.19 | 3.8 |
| Example 3-c | 19.1 (FTL-300) | 55 | 0.24 | 0.19 | 3.5 |
| Example 3-d | 22.2 (FTL-400) | 30 | 0.23 | 0.19 | 2.4 |

From these results, it is understood that it is possible to obtain an electrolyte membrane in which the swelling anisotropy is controlled at a value as low as less than 0.3 even in the case where the aspect ratio of the filler is changed within a range of at least 12.9 to 22.2.

EXAMPLE 4

Example where the Material of the Filler Differs

The material of the filler added to the electrolyte was changed, and electrolyte membranes were fabricated by a similar method to that in the case where the amount of the filler were 10 wt % in Example 1. Specifically, in place of $TiO_2$, boehmite filler (aspect ratio: 36.7) was used as the filler. Specifications of the filler used in this example and amounts of the respective materials used therein are shown in the following Table 7.

TABLE 7

Specifications of boehmite filler and amounts of respective materials in Example 4

| | Aspect ratio of boehmite filler | Amount of boehmite filler (wt %) | S-PES (g) | $TiO_2$ (g) | NMP (mL) |
|---|---|---|---|---|---|
| Example 4 | 36.7 | 10.0 | 2.43 | 0.27 | 21.3 |

The value of the aspect ratio is a measurement value by the SEM.

In a similar way to the above, for the electrolyte membrane Obtained in Example 4, a membrane thickness, a swelling ratio, swelling anisotropy, proton conductivity and tearing strength were measured. Results of the measurement are shown in the following Table 8. In a similar way, a measurement result of the swelling ratio is shown in FIG. 17, a calculation result of the swelling anisotropy is shown in FIG. 18, a measurement result of the proton conductivity is shown in FIG. 19, and a measurement result of the tearing strength is shown in FIG. 20.

TABLE 8

| | Aspect ratio of boehmite filler | Thickness of electrolyte membrane (μm) | Swelling anisotropy (λxy/λz) | Proton conductivity (S/cm) | Tearing strength (N/mm) |
|---|---|---|---|---|---|
| Example 4 | 36.7 | 41 | 0.15 | 0.15 | 2.1 |

From these results, it is understood that it is possible to obtain an electrolyte membrane in which the swelling anisotropy is controlled at a value as low as 0.15 even in the case where the material of the filler is changed and the aspect ratio of the filler is changed up to 36.7.

EXAMPLE 5

Example where the Type of Electrolyte Differs

The type of the electrolyte composing the electrolyte membrane was changed from the S-PES in Example 1 to a perfluorocarbon sulfonic acid polymer, and electrolyte membranes were fabricated by a similar method to that in Example 1.

Specifically, $TiO_2$ powder (FTL-100, made by Ishihara Sangyo Kaisha, Ltd.) with an aspect ratio of 12.9 was poured into a Nafion solution (DE2020, 20 wt % n-propanol solution made by DuPont Corporation) at amounts shown in the following Table 9, and obtained mixtures were stirred at approximately 1000 revolutions by a homogenizer for 20 minutes. Obtained Nafion solutions in which the $TiO_2$ filler was dispersed were spread by using an applicator made of stainless steel. A gap of the applicator was set at 0.32 mm, a sweeping speed thereof on glass plates was set at approximately 7.2 cm/min, and the Nafion solutions were coated on the glass plates. Thereafter, membranes thus obtained were subjected to heat treatment at 80 degrees Celsius for 2 hours and at 120 degrees Celsius for 10 minutes. The membranes after being subjected to the heat treatment were immersed together with the glass plates into pure water for three minutes, and the membranes were peeled from the glass plates. Thereafter, the membranes thus peeled were impregnated into 1N HCl of the room temperature for 10 hours, and subsequently, were immersed into the pure water again for 10 hours, whereby HCl was removed therefrom. The obtained membranes were dried at the room temperature for 10 hours, and electrolyte membranes were obtained.

COMPARATIVE EXAMPLE 2

As a comparative example in the case where the electrolyte is the perfluorocarbon sulfonic acid polymer (Nafion), a Nafion membrane having no filler was created. Specifically, the Nafion solution (DE2020, 20 wt % n-propanol solution made by DuPont Corporation) was spread by using the applicator made of stainless steel. The gap of the applicator was set at 0.32 mm, the sweeping speed thereof on a glass plate was set at approximately 7.2 cm/min, and the Nafion solution was coated on the glass plate. Thereafter, a membrane thus obtained was subjected to heat treatment at 80 degrees Celsius for 2 hours and at 120 degrees Celsius for 10 minutes. The membrane after being subjected to the heat treatment was immersed together with the glass plate into pure water for three minutes, and the membrane was peeled from the glass plate. Thereafter, the membrane thus peeled was impregnated into 1N HCl of the room temperature for 10 hours, and subsequently, was immersed into the pure water again for 10 hours, whereby HCl was removed therefrom. The obtained membranes was dried at the room temperature for 10 hours, and an electrolyte membrane was obtained. In Table 9, an amount of the Nafion solution was described.

TABLE 9

Amounts of DE2020 solutions and TiO$_2$ in Example 5 and Comparative example 2

|  | TiO$_2$ filler (wt %) | DE2020 solution (g) | TiO$_2$ (g) |
| --- | --- | --- | --- |
| Comparative example 2 | 0.0 | 15.0 | 0.00 |
| Example 5-a | 2.5 | 15.0 | 0.075 |
| Example 5-b | 5.0 | 15.0 | 0.15 |
| Example 5-c | 10.0 | 15.0 | 0.30 |
| Example 5-d | 20.0 | 15.0 | 0.60 |

Figure 21:
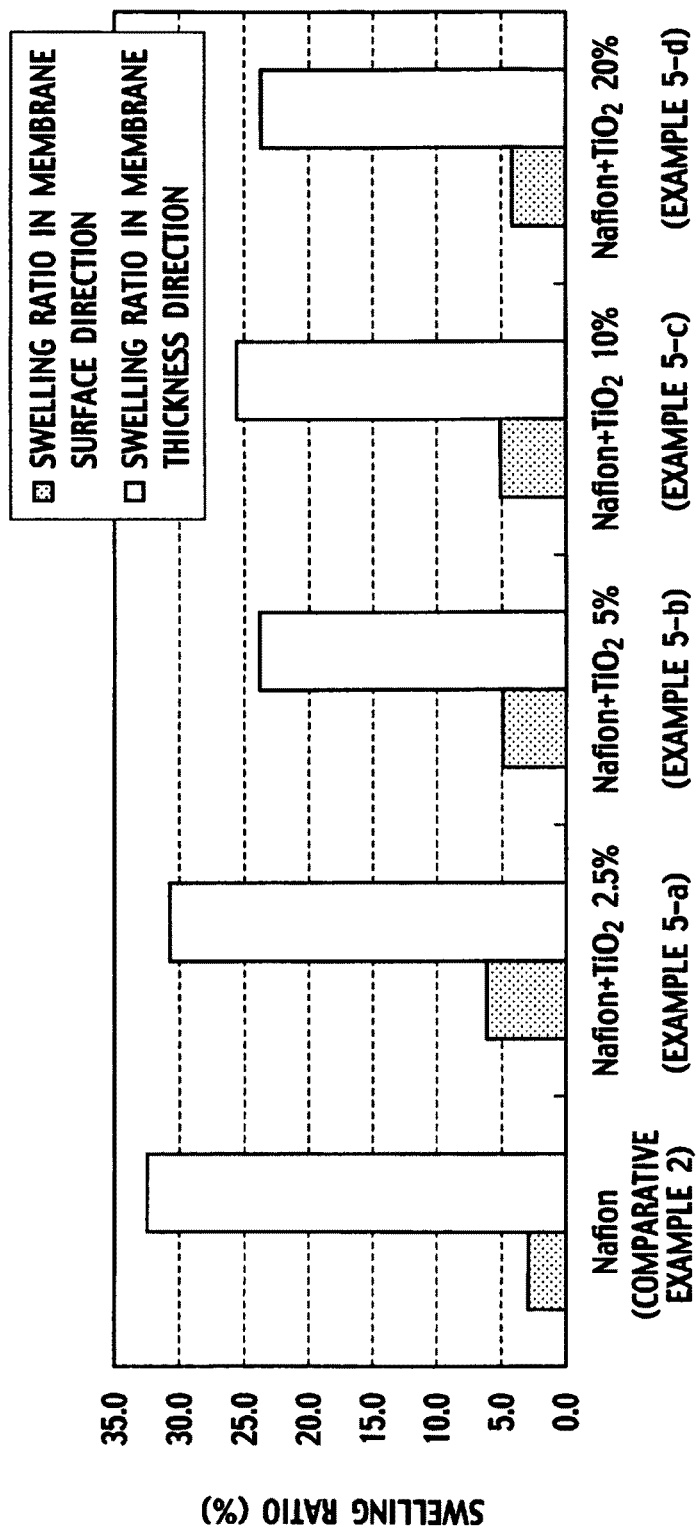
FIG. 21 is a graph showing results of measuring swelling ratios of electrolyte membranes prepared in Example 5 and Comparative example 2.
Figure 22:
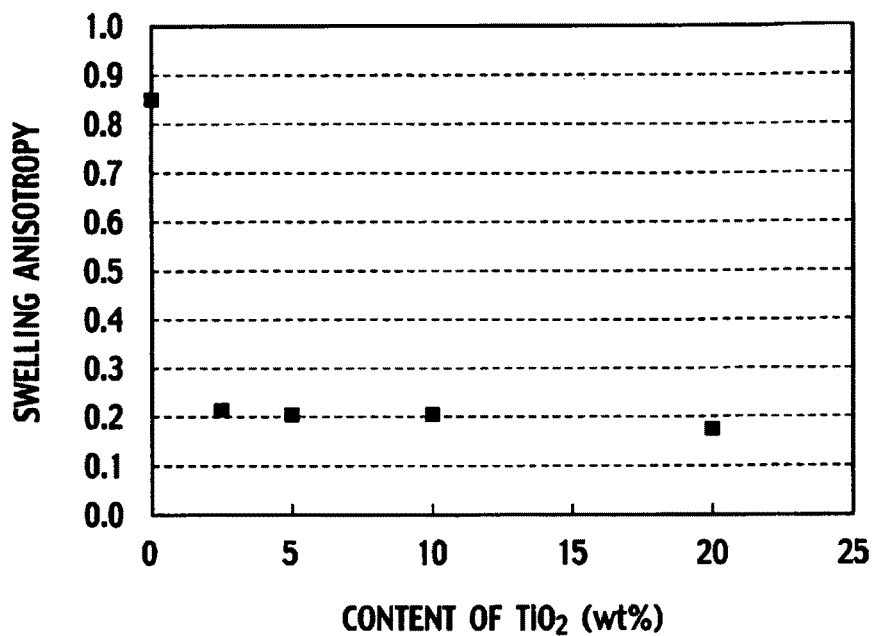
FIG. 22 is a graph showing results of measuring swelling anisotropies of the electrolyte membranes prepared in Example 5 and Comparative example 2.
Figure 23:
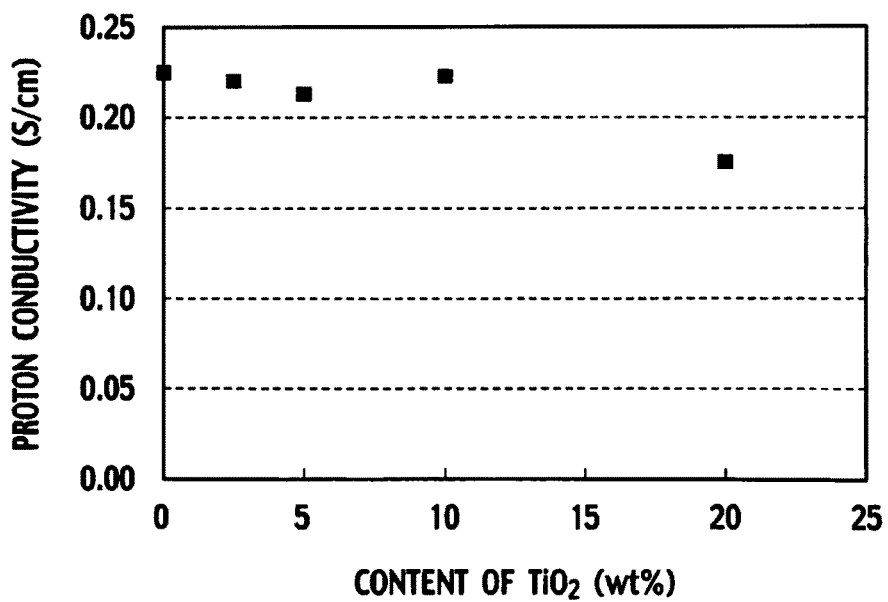
FIG. 23 is a graph showing results of measuring proton conductivities of the electrolyte membranes prepared in Example 5 and Comparative example 2.

In a similar way to the above, for the electrolyte membranes obtained in Example 5 and Comparative example 2, membrane thicknesses, swelling ratios, swelling anisotropies, and proton conductivities were measured. Results of the measurement are shown in the following Table 10. In a similar way, measurement results of the swelling ratios are shown in FIG. 21, calculation results of the swelling anisotropies are shown in FIG. 22, and measurement results of the proton conductivities are shown in FIG. 23.

TABLE 10

Membrane thicknesses, swelling anisotropies and proton conductivities of electrolyte membranes obtained in Example 5 and Comparative example 2

|  | TiO$_2$ filler (wt %) | Thickness of electrolyte membrane (μm) | Swelling anisotropy ($\lambda xy/\lambda z$) | Proton conductivity (S/cm) |
| --- | --- | --- | --- | --- |
| Comparative Example 2 | 0.0 | 26 | 0.85 | 0.23 |
| Example 5-a | 2.0 | 23 | 0.21 | 0.22 |
| Example 5-b | 5.0 | 25 | 0.20 | 0.21 |
| Example 5-c | 10.0 | 24 | 0.20 | 0.22 |
| Example 5-d | 20.0 | 28 | 0.17 | 0.17 |

From these results, it is understood that, in accordance with the present invention, it is possible to obtain an electrolyte membrane in which the swelling anisotropy is controlled at a value as low as less than 0.3 even in the case where the type of the electrolyte as the main component of the electrolyte membrane is changed.

The entire contents of a Japanese Patent Application No. P2007-168140 with a filing date of Jun. 26, 2007 and a Japanese Patent Application No. P2008-040176 with a filing date of Feb. 21, 2008 are herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

INDUSTRIAL APPLICABILITY

In accordance with the present invention, the swelling in the membrane surface direction of the electrolyte membrane can be suppressed efficiently with a smaller content of the filler than heretofore. Therefore, high proton conductivity is ensured while hardly decreasing the volume ratio of the electrolyte, whereby the durability of the electrolyte membrane can be enhanced.

The invention claimed is:
1. An electrolyte membrane, comprising:
a membrane body comprising: a filler; and a polymer electrolyte,
wherein a thickness of the membrane body is 1 micrometer to 500 micrometer, a moisture content of the membrane body is 10 mass % or more, and a swelling anisotropy of a swelling ratio in a membrane surface direction of the membrane body to a swelling ratio in a membrane thickness direction of the membrane body satisfies an equation having the form:

$$\frac{\lambda xy}{\lambda z} < 0.3$$

where Lambda z is the swelling ratio in the membrane thickness direction, and Lambda xy is the swelling ratio in the membrane surface direction, and
wherein an angle made by a center axis in a longitudinal direction of the filler and a surface parallel to the membrane surface direction is within 45 degrees.
2. An electrolyte membrane according to claim 1, wherein an aspect ratio of the filler is 10 to 1000.

3. An electrolyte membrane according to claim 1, wherein a content of the filler is 1 mass % to 90 mass % with respect to a total mass of the filler and the polymer electrolyte.

4. An electrolyte membrane according to claim 1, wherein the filler is oriented in the surface direction of the membrane body.

5. An electrolyte membrane according to claim 1, wherein the filler is subjected to surface treatment by an acid.

6. An electrolyte membrane according to claim 1, wherein a constituent material of the filler is at least one selected from the group consisting of titania, potassium titanate, silica, silica-alumina, zirconia, and boehmite.

7. A membrane electrode assembly, comprising:
an electrolyte membrane according to claim 1;
an anode catalyst layer and an anode gas diffusion layer, which are arranged on one surface of the electrolyte membrane; and
a cathode catalyst layer and a cathode gas diffusion layer, which are arranged on the other surface of the electrolyte membrane.

8. A fuel cell, comprising:
a membrane electrode assembly according to claim 7.

9. An electrolyte membrane according to claim 1, wherein an aspect ratio of the filler is 10 to 500.

10. An electrolyte membrane according to claim 1, wherein an aspect ratio of the filler is 10 to 150.

11. An electrolyte membrane according to claim 1, wherein the angle is within 30 degrees.

12. An electrolyte membrane according to claim 1, wherein an average diameter of the filler is 0.001 micrometer to 10 micrometer.

\* \* \* \* \*